US008908019B2

(12) United States Patent
Sato

(10) Patent No.: US 8,908,019 B2
(45) Date of Patent: Dec. 9, 2014

(54) SYSTEM AND METHOD FOR CONTROLLING SHUTTERS OF A SHUTTER GLASS VIEWING DEVICE

(75) Inventor: Ichiro Sato, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/438,181

(22) Filed: Apr. 3, 2012

(65) Prior Publication Data

US 2012/0188349 A1    Jul. 26, 2012

Related U.S. Application Data

(63) Continuation of application No. 12/932,240, filed on Feb. 22, 2011.

(30) Foreign Application Priority Data

Mar. 2, 2010  (JP) ................................ P2010-045805

(51) Int. Cl.
H04N 13/04    (2006.01)
H04N 13/00    (2006.01)

(52) U.S. Cl.
CPC ........... *H04N 13/0438* (2013.01); *H04N 13/04* (2013.01); *H04N 13/00* (2013.01)
USPC .......................................................... 348/56

(58) Field of Classification Search
CPC .................................................. H04N 13/0438
USPC .......................................................... 348/56
See application file for complete search history.

(56) References Cited

U.S. PATENT DOCUMENTS

| 5,701,152 | A | | 12/1997 | Chen |
| 5,860,912 | A | * | 1/1999 | Chiba ............................ 600/111 |
| 2002/0024592 | A1 | * | 2/2002 | Uomori et al. ................... 348/42 |
| 2007/0127121 | A1 | * | 6/2007 | Maximus et al. ............. 359/465 |
| 2010/0118128 | A1 | * | 5/2010 | Choi ............................... 348/53 |

(Continued)

FOREIGN PATENT DOCUMENTS

| CN | 101536068 A | 9/2009 |
| JP | 62-276989 | 12/1987 |
| JP | 09-138384 | * 5/1997 .............. G02F 1/133 |
| JP | 2005152517 A | 6/2005 |

OTHER PUBLICATIONS

Video Electronics Standards Association, "VESA Standard Connector and Signal Standards for Stereoscopic Display Hardware", Version 1, pp. 1-4, Nov. 5, 1997.

(Continued)

*Primary Examiner* — Sath V Perungavoor
*Assistant Examiner* — James Pontius
(74) *Attorney, Agent, or Firm* — Lerner, David, Littenberg, Krumholz & Mentlik, LLP

(57) ABSTRACT

There are provided a transmitter, a display, a shutter eyeglass device, a transmission/reception system, a display system and a transmission/reception method allowed to achieve highly reliable communication between a transmission side and a reception side. The transmitter includes: a transmission section holding plural kinds of commands each represented by a plurality of bits and repeatedly transmitting a command set, the command set being configured of one or more kinds of commands which are selected from the plural kinds of commands and combined in predetermined order, in which a bit pattern representing a whole of the command set is the same as a bit pattern held in a receiver.

17 Claims, 15 Drawing Sheets

(56) References Cited

U.S. PATENT DOCUMENTS

| | | |
|---|---|---|
| 2010/0188488 A1 | 7/2010 | Birnbaum et al. |
| 2010/0207954 A1* | 8/2010 | Kim .............................. 345/589 |
| 2010/0289883 A1* | 11/2010 | Goris et al. ..................... 348/56 |
| 2010/0309535 A1* | 12/2010 | Landowski et al. ........... 359/107 |
| 2010/0315316 A1 | 12/2010 | Mihara et al. |

OTHER PUBLICATIONS

Office Action from Chinese Application No. 2011-10043393.0, dated Jun. 23, 2014.

* cited by examiner

FIG. 6A
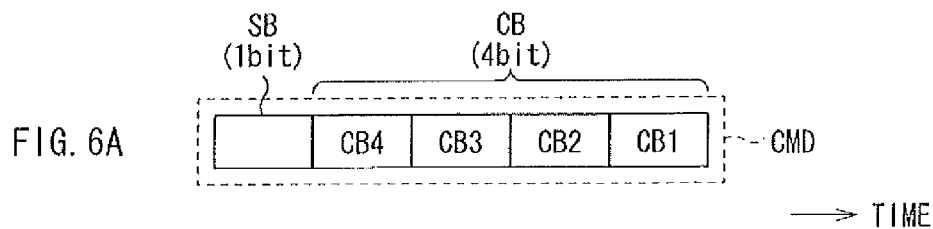
FIG. 6B
| | COMMAND | CB4 | CB3 | CB2 | CB1 |
|---|---|---|---|---|---|
| A | L-Close | 1 | 0 | 0 | 0 |
| B | L-Open | 0 | 1 | 0 | 0 |
| C | R-Close | 0 | 0 | 1 | 0 |
| D | R-Open | 0 | 0 | 0 | 1 |
| E | L-Open/R-Close | 1 | 0 | 1 | 0 |
| F | R-Open/L-Close | 0 | 1 | 0 | 1 |
FIG. 6C
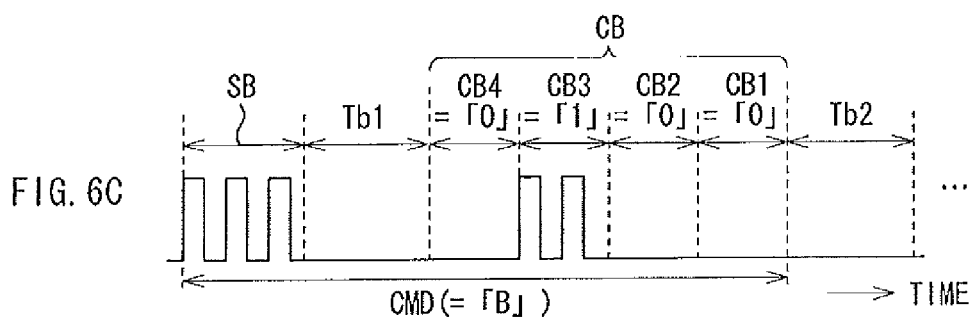

SYSTEM AND METHOD FOR CONTROLLING SHUTTERS OF A SHUTTER GLASS VIEWING DEVICE

CROSS-REFERENCE TO RELATED APPLICATIONS

This application is a continuation of U.S. application Ser. No. 12/932,240, filed on Feb. 22, 2011, which claims priority from Japanese Patent Application No. JP 2010-045805 filed in the Japanese Patent Office on Mar. 2, 2010, the entire contents of which are incorporated herein by reference.

BACKGROUND OF THE INVENTION

1. Field of the Invention

The present invention relates to a transmission/reception system and a display system using a receiver such as a shutter eyeglass device, and a transmitter, a shutter eyeglass device, a display and a transmission/reception method which are suitably used in such systems.

2. Description of the Related Art

In recent years, display systems allowed to achieve stereoscopic display have attracted attention. One of such display systems is a display system using a shutter eyeglass device. In the display system, a left-eye picture stream and a right-eye picture stream which have a parallax therebetween are alternately displayed on a display in a time-divisional manner, and switching of open/close states of a left-eye shutter and a right-eye shutter in the shutter eyeglass device is controlled in synchronization with switching timing between the picture streams (display timings). When such switching is repeated, a viewer is allowed to perceive a picture configured of the pictures as a stereoscopic picture with a depth.

Typically, such switching of open/close states of the left-eye shutter and the right-eye shutter in the shutter eyeglass device is controlled in response to a shutter control signal supplied from a display as described in Video Electronics Standards Association, "VESA Standard Connector and Signal Standards for Stereoscopic Display Hardware", Version 1, Nov. 5, 1997. In a method of controlling a shutter eyeglass device in Video Electronics Standards Association, "VESA Standard Connector and Signal Standards for Stereoscopic Display Hardware", Version 1, Nov. 5, 1997, as a shutter control signal, a signal with a duty ratio of 50% is used. Then, when a level signal of the shutter control signal is in a high level, the left-eye picture stream is controlled to be displayed on the display and the left-eye shutter of the shutter eyeglass device is controlled to be opened, and when the level signal is in a low level, the right-eye picture stream is controlled to be displayed on the display and the right-eye shutter of the shutter eyeglass device is controlled to be opened.

SUMMARY OF THE INVENTION

In an environment where the above-described display system is used, typically, for example, radio signals (such as infrared signals) used for remote control of other electronic devices are frequently transmitted around. Therefore, in the display system, a shutter control signal transmitted from the display (a transmission side) to the shutter eyeglass device (a reception side) may be affected by such an external signal to include noise (external noise). The shutter control signal including external noise causes a malfunction or the like on the reception side, and it is difficult to achieve highly reliable communication.

In methods of controlling a shutter eyeglass device in related art including the above-described technique in Video Electronics Standards Association, "VESA Standard Connector and Signal Standards for Stereoscopic Display Hardware", Version 1, Nov. 5, 1997, measures against such external noise are not taken, or they are not sufficient; therefore, it is desirable to propose a technique allowed to improve reliability of communication.

It is desirable to provide a transmitter, a display, a shutter eyeglass device, a transmission/reception system, a display system and a transmission/reception method which are allowed to achieve highly reliable communication between a transmission side and a reception side.

According to an embodiment of the invention, there is provided a transmitter including: a transmission section holding plural kinds of commands each represented by a plurality of bits and repeatedly transmitting a command set, the command set being configured of one or more kinds of commands which are selected from the plural kinds of commands and combined in predetermined order, in which a bit pattern representing a whole of the command set is the same as a bit pattern held in a receiver.

According to an embodiment of the invention, there is provided a display including: a display section displaying pictures through switching plural kinds of picture streams from one to another in order; and a transmission section transmitting a shutter control command represented by a plurality of bits to a shutter eyeglass device performing an open/close operation in synchronization with switching timing between the plural kinds of picture streams. The transmission section holds plural kinds of the shutter control commands and repeatedly transmits a command set, the command set being configured of one or more kinds of shutter control commands which are selected from the plural kinds of shutter control commands and combined in predetermined order. A bit pattern representing a whole of the command set is the same as a bit pattern held in the shutter eyeglass device.

According to an embodiment of the invention, there is provided a shutter eyeglass device including: a reception section receiving a command set from a display, the display holding plural kinds of shutter control commands each represented by a plurality of bits and repeatedly transmitting the command set, the command set being configured one or more kinds of shutter control commands which are selected from the plural kinds of shutter control commands and combined in predetermined order; a left-eye shutter and a right-eye shutter performing, based on the received command set, an open/close operation in synchronization with switching timing between plural kinds of picture streams which are switched, for displaying, from one to another in order; and a holding section holding the same bit pattern as a bit pattern representing a whole of the command set.

According to an embodiment of the invention, there is provided a transmission/reception system including: the transmitter according to the above-described embodiment of the invention; and the shutter eyeglass device according to the above-described embodiment of the invention.

According to an embodiment of the invention, there is provided a display system including: the display according to the above-described embodiment of the invention; and the shutter eyeglass device according to the above-described embodiment of the invention.

According to an embodiment of the invention, there is provided a transmission/reception method including steps of: in a transmitter, generating a command set configured of one or more kinds of shutter control commands which are selected from plural kinds of shutter control commands each represented by a plurality of bits so that a bit pattern representing a whole of the command set is the same as a bit pattern held in a shutter eyeglass device, and repeatedly transmitting the command set; receiving the command set in the shutter eyeglass device; and allowing a left-eye shutter and a right-eye shutter in the shutter eyeglass device to perform, based on the received command set, an open/close operation in synchronization with switching timing between plural kinds of picture streams in a display displaying pictures through switching the plural kinds of picture streams from one to another in order.

In the transmitter, the display, the shutter eyeglass device, the transmission/reception system, the display system and the transmission/reception method according to the embodiment of the invention, in the command set which is configured of one or more kinds of commands (or shutter control commands) selected from plural kinds of commands and is repeatedly transmitted from the transmitter (or a transmission section), the bit pattern representing a whole of the command set is the same as the bit pattern held in the receiver (or the shutter eyeglass device). Therefore, when a signal including the command set is transmitted from a transmission side to a reception side, on the reception side, it is easy to determine whether the command set includes external noise.

In the transmitter, the display, the shutter eyeglass device, the transmission/reception system, the display system and the transmission/reception method according to the embodiment of the invention, in the command set repeatedly transmitted from the transmitter (or the transmission section), the bit pattern representing as a whole of the command set is the same as the bit pattern held in the receiver (or the shutter eyeglass device); therefore, when a signal including the command set is transmitted from the transmission side to the reception side, whether the command set includes external noise is allowed to be determined easily on the reception side. Therefore, the influence of such external noise is easily reduced or prevented, and highly reliable communication between the transmission side and the reception side is achievable.

Other and further objects, features and advantages of the invention will appear more fully from the following description.

BRIEF DESCRIPTION OF THE DRAWINGS

FIGS. 6A, 6B and 6C are illustrations of a configuration example of a command used in the display system illustrated in FIG. 1.

FIG. 8 is an illustration of an example of a relationship between a synchronization control signal illustrated in FIG. 1 and transmission modes or the like.

DETAILED DESCRIPTION OF THE PREFERRED EMBODIMENTS

A preferred embodiment of the invention will be described in detail below referring to the accompanying drawings. Descriptions will be given in the following order.
Embodiment (Example of a stereoscopic display system configured by incorporating a transmitter in a display)
Modifications
Modification 1 (Example of a stereoscopic display system configured by arranging a transmitter outside a display)
Modification 2 (Example of a multi-view system)
Embodiment
Whole Configuration of Display System 1

Figure 1:
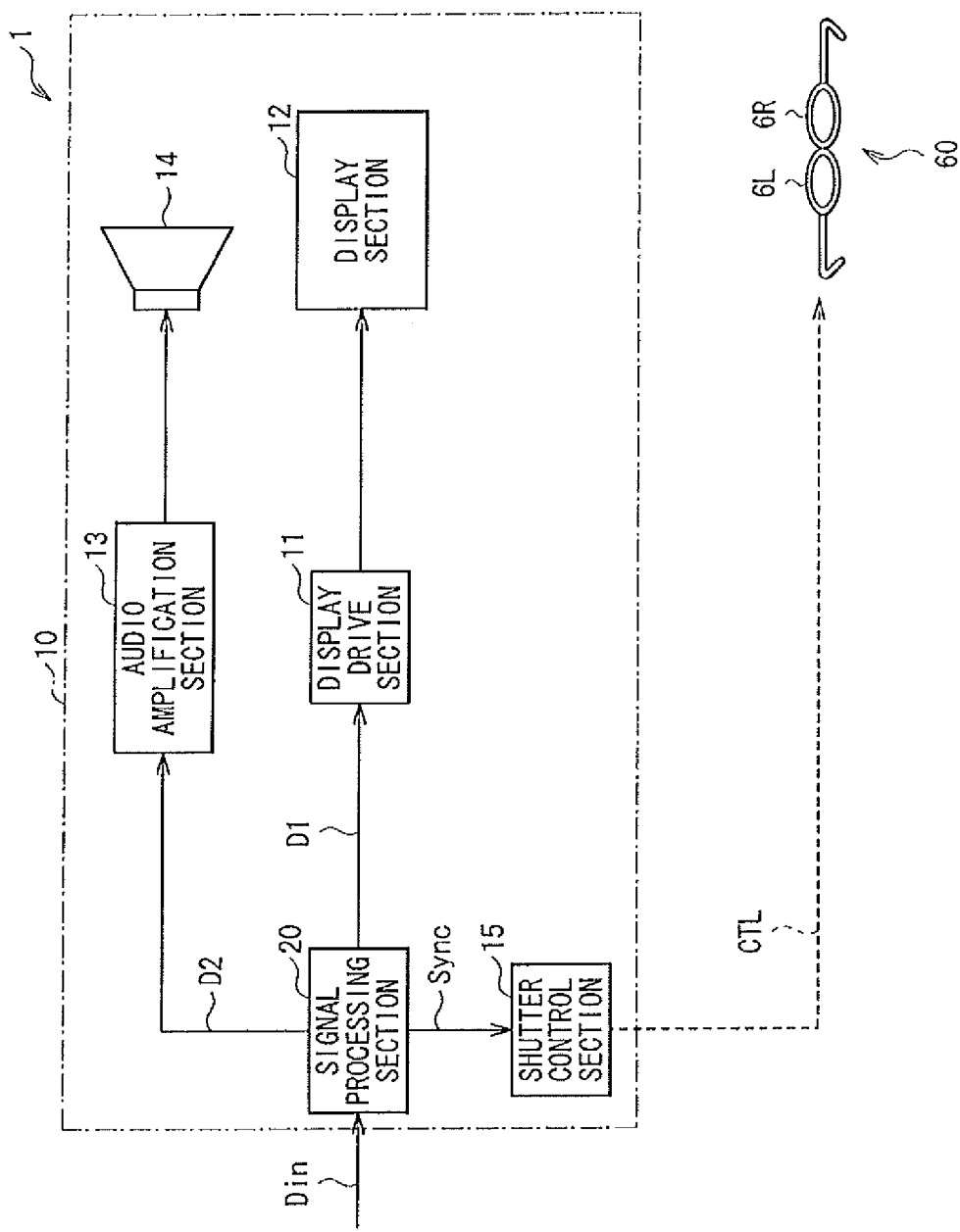
FIG. 1 is a block diagram illustrating a configuration example of a display system according to an embodiment of the invention.

FIG. 1 illustrates a whole configuration of a display system (a display system 1) according to an embodiment of the invention. The display system 1 is a stereoscopic display system performing stereoscopic display by alternately displaying a left-eye picture stream and a right-eye picture stream which have a parallax therebetween in a time-divisional manner and controlling switching of open/close states of left and right shutters of a shutter eyeglass device in synchronization with switching (display timings) of the left-eye picture stream and the right-eye picture stream. The display system 1 includes a display 10 as a display according to an embodiment of the invention and a shutter eyeglass device 60 as a shutter eyeglass device (a receiver) according to an embodiment of the invention.

Specific Configuration of Display 10

The display 10 includes a signal processing section 20, a display drive section 11, a display section 12, an audio amplification section 13, a speaker 14 and a shutter control section 15. Based on an input signal Din including a stereoscopic picture signal, the display 10 displays a picture on the display section 12 and outputs sound from the speaker 14. Herein, the stereoscopic picture signal is a picture signal configured by alternately arranging a left-eye picture stream and a right-eye picture stream which have a parallax therebetween along a time axis. Note that the shutter control section 15 corresponds to a specific example of "a transmitter" and "a transmission section" in the invention.

Signal Processing Section 20

The signal processing section 20 generates a picture signal D1 including a left-eye picture signal and a right-eye picture signal and an audio signal D2 based on the input signal Din. The signal processing section 20 also has a function of generating and outputting a signal for controlling the shutter control section 15. More specifically, as will be described in detail later, a picture signal processing circuit (which will be described later) in the signal processing section 20 outputs a synchronization control signal Sync in synchronization with the left-eye picture signal and the right-eye picture signal and supplies the synchronization control signal Sync to the shutter control section 15.

Figure 2:
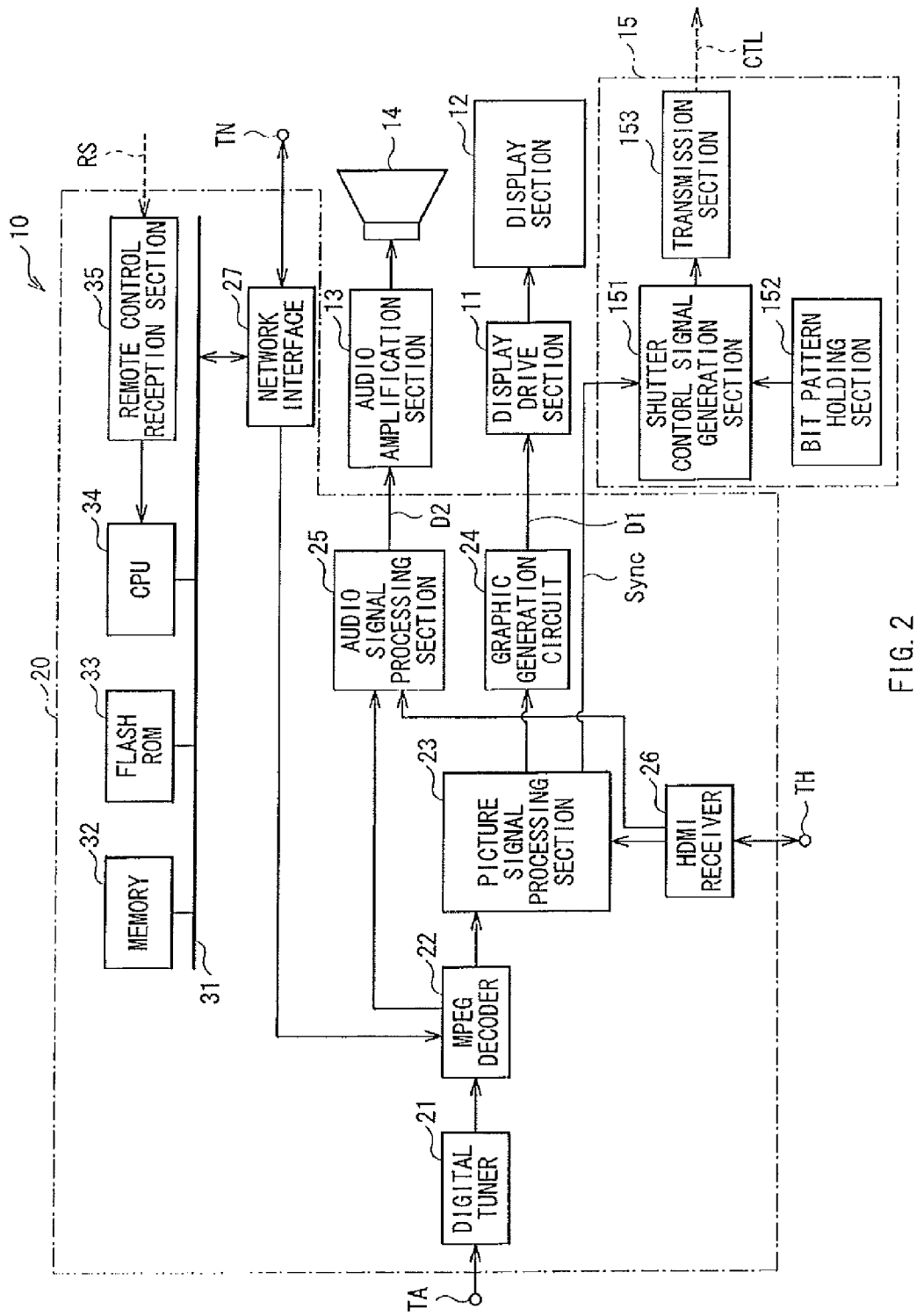
FIG. 2 is a block diagram illustrating a configuration example of a display illustrated in FIG. 1.

As illustrated in FIG. 2, the signal processing section 20 includes a digital tuner 21, an MPEG (Moving Picture Experts Group) decoder 22, the picture signal processing circuit 23, a graphic generation circuit 24, an audio signal processing circuit 25, an HDMI (High-Definition Multimedia Interface) receiver 26 and a network interface 27.

The digital tuner 21 selects a desired signal (stream) from broadcast waves (corresponding to the input signal Din in FIG. 1) received by an antenna (not illustrated) and supplied through an antenna terminal TA. The MPEG decoder extracts a picture signal and an audio signal from the stream selected by the digital tuner 21.

The picture signal processing circuit 23 performs picture signal processing such as gamma processing, YUV-RGB conversion or sequential frame output on the picture signal extracted by the MPEG decoder 22, and has a function of generating the synchronization control signal Sync. An operation of generating the synchronization control signal Sync will be described in detail later.

The graphic generation circuit 24 generates OSD (On Screen Display) information, and superimposes the OSD information on a picture supplied from the picture signal processing circuit 23 to generate an output signal, and supplies the output signal as a picture signal D1 to the display drive section 11. The audio signal processing circuit performs audio signal processing such as surround processing on the audio signal extracted by the MPEG decoder to generate an output signal, and supplies the output signal as an audio signal D2 to the audio amplification section 13.

In the display 10 illustrated in FIG. 2, a plurality of signals in addition to the above-described broadcast waves are allowed to be selected as the input signal Din. More specifically, as will be described later, for example, a signal from an external apparatus such a BD (Blu-ray Disk) recorder or an IP (Internet Protocol) broadcast signal is allowed to be selected as the input signal Din.

The HDMI receiver 26 is a circuit receiving a signal supplied from an external apparatus (not illustrated) through an HDMI terminal TH. The HDMI receiver 26 has a function of extracting a picture signal and an audio signal from the received signal to supply the picture signal and the audio signal to the picture signal processing circuit 23 and the audio signal processing circuit 25, respectively.

The network interface 27 receives an IP broadcast signal supplied through a network terminal TN connected to the Internet to supply the received IP broadcast signal to the MPEG decoder 22.

The signal processing section 20 further includes a memory 32, a flash ROM 33 and a CPU 34 which are connected to one another through an internal bus 31. The internal bus 31 is connected to the network interface 27. The signal processing section 20 further includes a remote control reception section 35. The remote control reception section 35 receives a remote control signal RS (for example, an infrared signal) as a command signal from an external remote control unit (not illustrated) to supply the remote control signal RS to the CPU 34.

Display Drive Section 11 and Display Section 12

In FIG. 1, the display drive section 11 is a circuit generating a drive signal for driving the display section 12 based on the picture signal D1 supplied from the signal processing section 20. The display section 12 alternately displays the left-eye picture stream and the right-eye picture stream in response to the drive signal supplied from the display drive section 11.

Figure 3:
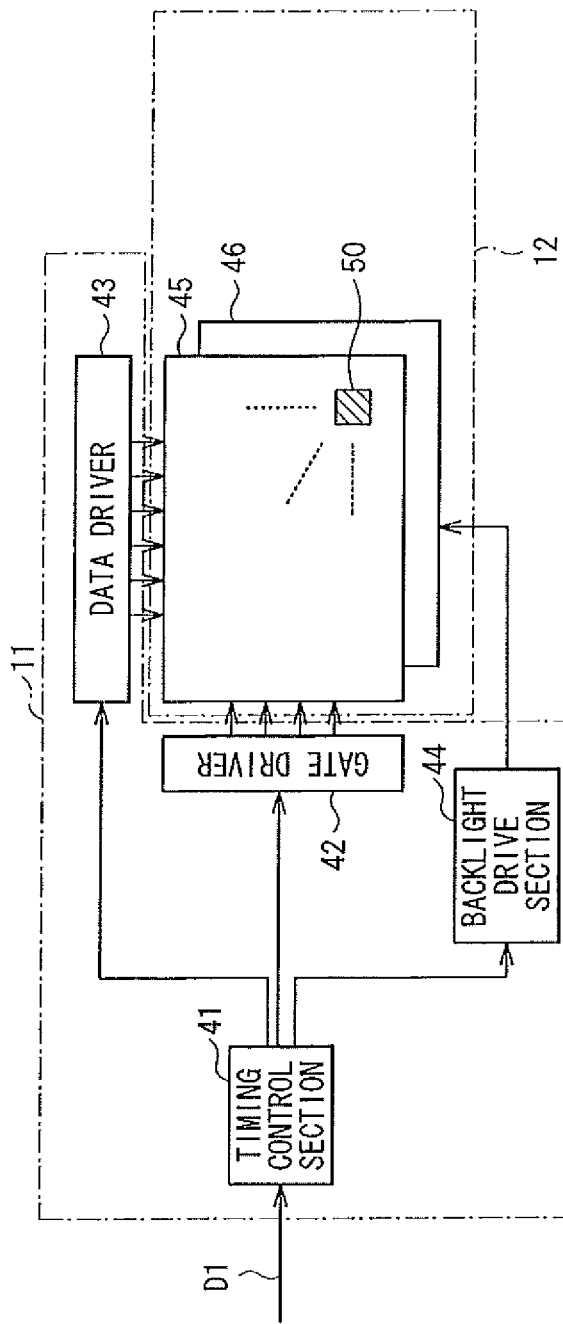
FIG. 3 is a block diagram illustrating configuration examples of a display drive section and a display section illustrated in FIG. 1.
Figure 4:
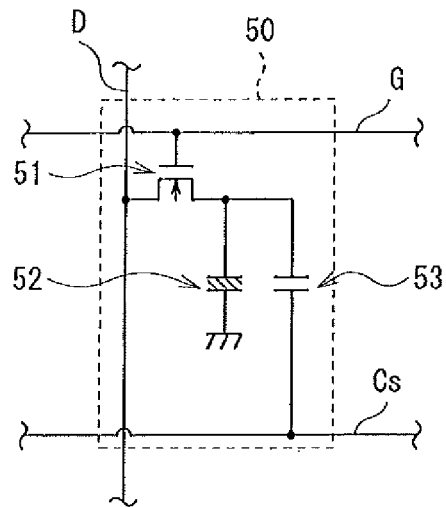
FIG. 4 is a circuit diagram illustrating a configuration example of a pixel illustrated in FIG. 3.

Referring to FIGS. 3 and 4, configuration examples of the display drive section 11 and the display section 12 will be described below. FIG. 3 illustrates the configuration examples of the display drive section 11 and the display section 12. As illustrated in FIG. 3, the display section 12 includes a liquid crystal display device 45 and a backlight 46. Moreover, the display drive section 11 includes a timing control section 41, a gate driver 42, a data driver 43 and a backlight drive section 44.

The liquid crystal display device 45 displays a picture based on a pixel signal supplied from the data driver 43. In the liquid crystal display device 45, pixels 50 are arranged in a matrix form.

As illustrated in FIG. 4, each of the pixels 50 includes a TFT (Thin Film Transistor) element 51, a liquid crystal element 52 and a retention capacity element 53. The TFT element 51 is configured of, for example, a MOS-FET (Metal Oxide Semiconductor-Field Effect Transistor). A gate and a source of the TFT element 51 is connected to a gate line G and a data line D, respectively, and a drain of the TFT element 51 is connected to one end of the liquid crystal element 52 and one end of a retention capacity element 53. The one end of the liquid crystal element 52 is connected to the drain of the TFT element 51, and the other end of the liquid crystal element 52 is grounded. The one end of the retention capacity element 53 is connected to the drain of the TFT element 51, and the other end of the retention capacity element 53 is connected to a retention capacity line Cs. In addition, the gate line G is connected to the gate driver 42, and the data line D is connected to the data driver 43.

The backlight 46 is a light source applying light to the liquid crystal display device 45, and is configured with use of, for example, an LED (Light Emitting Diode) or a CCFL (Cold Cathode Fluorescent Lamp).

The timing control section 41 controls drive timings of the gate driver 42, the data driver 43 and the backlight drive section 44, and supplies, to the data driver 42, the picture signal D1 supplied from the signal processing section 20. The gate driver 42 selects the pixels 50 in the liquid crystal display device 45 on a column-by-column basis in response to timing control by the timing control section 41 to perform line-sequential scanning. The data driver 43 supplies a pixel signal based on the picture signal D1 to each of the pixels 50 of the liquid crystal display device 45. More specifically, the data driver 43 performs D/A (digital/analog) conversion on the picture signal D1 to generate a pixel signal which is an analog signal and then supplies the pixel signal to each of the pixels 50. The backlight drive section 44 controls a lighting operation of the backlight 46 in response to timing control by the timing control section 41.

With such a configuration, in the display section 12 the pixel signal is supplied from the data driver 43 to the pixel 50 selected by the gate driver 42. As a result, light from the backlight 46 is modulated by the liquid crystal element 52 of the selected pixel 50. These operations are performed on a display surface of the liquid crystal display device 45 by line-sequential scanning to display a picture. The display section 12 performs such a display operation on each of the left-eye picture signal and the right-eye picture signal alternately supplied to alternately display the left-eye picture stream and the right-eye picture stream in a time-divisional manner.

Audio Amplification Section 13 and Speaker 14

In FIG. 1, the audio amplification section 13 amplifies the audio signal D2 supplied from the signal processing section 20. The speaker 14 outputs the audio signal amplified by the audio amplification section 13.

Shutter Control Section 15

The shutter control section 15 generates a shutter control signal CTL based on the synchronization control signal Sync supplied from the signal processing section 20 to supply the shutter control signal CTL to the shutter eyeglass device through radio communication using, for example, infrared radiation or radio waves. The shutter control signal CTL is a coded signal for controlling an open/close operation of the shutter eyeglass device 60, and is a signal including a command set CS which will be described later, and is a signal in synchronization with the left-eye picture stream and the right-eye picture stream displayed on the display 10. Note that the command set CS is configured by combining, in predetermined order, shutter control commands CMD of one or more kinds (in this case, two or more kinds) selected from plural kinds of shutter control commands CMD. As will be described in detail later, for the purpose of reducing a crosstalk phenomenon (picture interference) or flickers (picture flickers) when viewing a stereoscopic picture, or the like, the shutter control section 15 is configured to perform transmission in a plurality of transmission modes. Then, different command sets CS are provided for the plurality of transmission modes, respectively.

As illustrated in FIG. 2, the shutter control section 15 includes a shutter control signal generation section 151, a bit pattern holding section 152 and a transmission section 153.

The bit pattern holding section 152 holds plural kinds of shutter control commands CMD represented by a plurality of bits which will be described later. More specifically, the bit pattern holding section 152 holds respective bit patterns for the plural kinds of shutter control commands CMD and respective transmission sequences (a bit pattern of a whole command set CS) of the shutter control commands CMD for the above-described plurality of transmission modes.

The shutter control signal generation section 151 generates the shutter control signal based on the synchronization control signal Sync to supply the shutter control signal CTL to the transmission section 153. More specifically, first, one transmission mode is selected from the plurality of transmission modes based on a duty ratio of the synchronization control signal Sync. Then, the shutter control signal CTL including the command set CS provided for the selected transmission mode is generated with use of the plural kinds of shutter control commands CMD held in the bit pattern holding section 152. An operation of generating such a shutter control signal (the command set CS) will be described in detail later.

The transmission section 153 transmits the shutter control signal CTL through radio communication using, for example, infrared radiation or radio waves to supply the shutter control signal CTL to the shutter eyeglass device 60. More specifically, the transmission section 153 repeatedly transmits the command set CS generated by the shutter control signal generation section 151. In this example, the transmission section 153 transmits the shutter control signal CTL through radio communication, but may transmit the shutter control signal CTL through cable communication.

At this time, the transmission section 153 preferably transmits the shutter control signal CTL with use of one or both of infrared light with a different wavelength from that of infrared light used for remote control of an existing electronic device (for example, a remote control unit (not illustrated)) and a different subcarrier frequency from a subcarrier frequency used for the remote control. More specifically, as infrared light used for remote control of the remote control unit typically has a wavelength of approximately 940 nm and a subcarrier frequency of approximately 40 kHz, for example, infrared light with a wavelength of approximately 850 nm and a subcarrier frequency of approximately 25 kHz is allowed to be used as infrared light used for the shutter control signal CTL. Therefore, an interference between the shutter control signal CTL and a remote control signal (for example, a remote control signal RS illustrated in FIG. 2) for the above-described existing electronic device is preventable, and external noise included in the shutter control signal CTL is allowed to be reduced or prevented.

Specific Configuration of Shutter Eyeglass Device 60

The shutter eyeglass device 60 allows a viewer (not illustrated) of the display 10 to perceive stereoscopic vision. As illustrated in FIG. 1, the shutter eyeglass device 60 includes a left-eye shutter 6L and a right-eye shutter 6R. Light-shielding states (open and close states) of the left-eye shutter 6L and the right-eye shutter 6R are controlled by the shutter control signal CTL supplied from the shutter control section 15.

Figure 5:
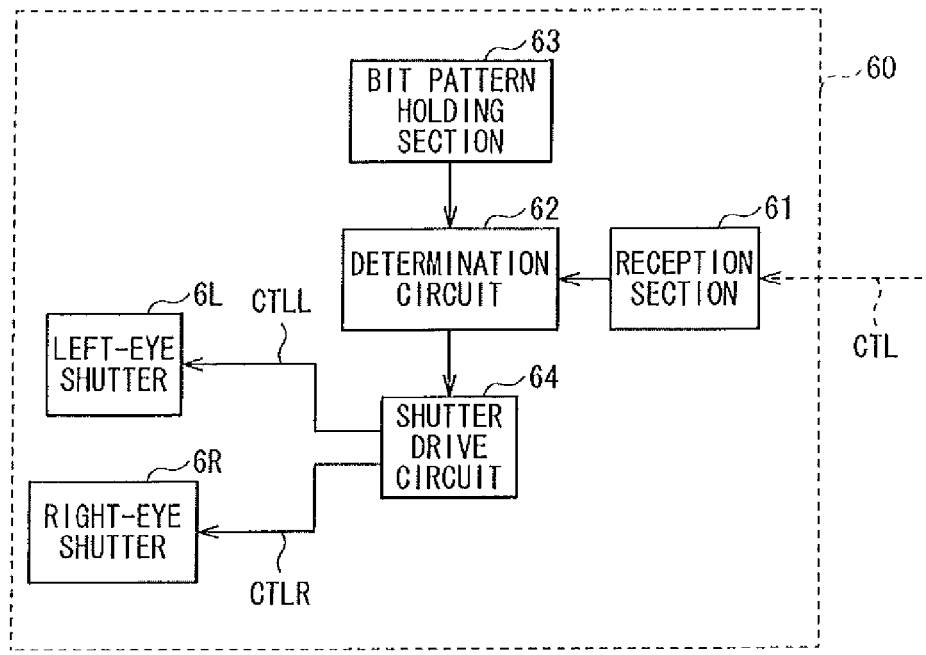
FIG. 5 is a block diagram illustrating a configuration example of a shutter eyeglass device illustrated in FIG. 1.

FIG. 5 illustrates a specific configuration example of the shutter eyeglass device 60. The shutter eyeglass device 60 includes a reception section 61, a determination circuit 62 (pattern-matching section), a bit pattern holding section 63 (a holding section), a shutter drive circuit 64 (a drive section), the left-eye shutter 6L and the right-eye shutter 6R.

The reception section 61 receives the shutter control signal CTL supplied from the transmission section 29 in the display 10 through radio communication. In other words, the reception section 61 receives the above-described command set CS from the transmission section 29 repeatedly transmitting the command set CS in the display 10.

The bit pattern holding section 63 holds the same bit pattern as a bit pattern formed in a command set CS which is expected (assumed) to be received by the reception section 61. In other words, the bit pattern holding section 63 holds the same bit pattern as that of the bit pattern holding section 152 in the shutter control section 15 in advance. More specifically, the bit pattern holding section 63 holds plural kinds of shutter control commands CMD, and holds respective bit patterns for the plural kinds of shutter control command CMD and respective transmission sequences (the bit patterns representing as a whole of the command sets CS) of the shutter control commands CMD for the above-described plurality of transmission mode.

The determination circuit 62 interprets a control code (the bit pattern representing as a whole of the command set CS) of the shutter control signal CTL received by the reception section 61 to determine open/close instructions to the left-eye shutter 6L and the right-eye shutter 6R. More specifically, the determination circuit 62 performing pattern matching between the received bit pattern representing as a whole of the command set CS and the bit pattern in a corresponding transmission mode held in the bit pattern holding section 63.

The shutter drive circuit 64 is a circuit driving the left-eye shutter 6L and the right-eye shutter 6R to be opened or closed in response to a signal (a signal representing a determination result) supplied from the determination circuit 62. More specifically, the shutter drive circuit 64 generates a left-eye shutter control signal CTLL for the left-eye shutter 6L and a right-eye shutter control signal CTLR for the right-eye shutter 6R to supply the left-eye shutter control signal CTLL and the right-eye shutter control signal CTLR to the left-eye shutter 6L and the right-eye shutter 6R, respectively.

The left-eye shutter 6L performs an open/close operation in response to the left-eye shutter control signal CTLL supplied from the shutter drive circuit 63. The right-eye shutter 6R performs an open/close operation in response to the right-eye shutter control signal CTLR supplied from the shutter drive circuit 63. The left-eye shutter 6L and the right-eye shutter 6R each are configured of a light-shielding shutter such as a liquid crystal shutter.

Specific Configuration of Shutter Control Signal CTL

Next, referring to FIGS. 6A, 6B and 6C, a specific configuration of the shutter control signal CTL will be described below. FIGS. 6A, 6B and 6C illustrate a configuration example of the shutter control command CMD included in the shutter control signal CTL. FIGS. 6A, 6B and 6C illustrate a whole configuration example of the shutter control command CMD, an example of a command table CT defining a relationship between the description of the shutter control command CMD and the bit pattern of the command bit CB, and an example of a timing waveform (a pulse waveform) of the shutter control command CMD, respectively.

For example, as illustrated in FIG. 6A, the shutter control command CMD includes a start bit SB configured of one bit and a command bit CB configured of four bits (CB4 to CB1 in order from a higher-order bit to a lower-order bit).

The start bit SB functions as a preamble of the control code in the shutter control signal command CMD, and is configured of a predetermined bit. Note that the determination circuit 62 in the shutter eyeglass device 60 detects the start bit SB to perform detection of the command bit CB.

Command Bit CB

The command bit CB defines specific descriptions of plural kinds (in this case, six kinds) of control commands CMDs, for example, as illustrated in descriptions ("A" to "F") of the control commands CMD in the command table CT in FIG. 6B. In other words, the command bit CB instructs one or both of the left-eye shutter 6L and the right-eye shutter 6R in the shutter eyeglass device 60 to perform an open/close drive.

More specifically, in this case, when the command bit CB is "1000" (CB4="1", CB3="0", CB2="0" and CB1="0"), the description ("A") of the shutter control command CMD is a command for the left-eye shutter 6L to perform a closing operation ("L-Close"). Likewise, when the command bit CB is "0100", the description ("B") of the shutter control command CMD is a command for the left-eye shutter 6L to perform an opening operation ("L-Open"). When the command bit CB is "0010", the description ("C") of the shutter control command CMD is a command for the right-eye shutter 6R to perform a closing operation ("R-Close"). When the command bit CB is "0001", the description ("D") of the shutter control command CMD is a command for the right-eye shutter 6R to perform an opening operation ("R-Open"). Moreover, when the command bit CB is "1010", the description ("E") of the shutter control command CMD is a command for the left-eye shutter 6L and the right-eye shutter 6R to perform an opening operation and a closing operation, respectively ("L-Open/R-Close"). Likewise, when the command bit CB is "0101", the description ("F") of the shutter control command CMD is a command for the right-eye shutter 6R and the left-eye shutter 6L to perform an opening operation and a closing operation, respectively ("R-Open/L-Close"). In other words, when the shutter control command CMD is "E" or "F", the shutter control command CMD is a command (a complex command) allowing the left-eye shutter 6L and the right-eye shutter 6R to perform the operations. In this case, any other bit pattern in the command bit CB is not allowed to be used.

The shutter control command CMD with such a configuration has, for example, the timing waveform (pulse waveform) illustrated in FIG. 6C (in an example when the shutter control command CMD is "B"). In other words, in this case, the start bit SB is configured of three pulses, and the bits CB4 to CB1 in the command bit CB each are configured of two pulses. Note that Tb1 and Tb2 in the drawing are a blank period Tb1 between the start bit SB and the command bit CB and a blank period Tb2 between the command bit CB and a following shutter control command CMD, respectively.

Functions and Effects of Display System

Next, functions and effects of the display system 1 according to the embodiment will be described below.

1. Brief Description of Whole Operation

The signal processing section 20 generates the picture signal D1 and the audio signal D2 based on the input signal Din including a stereoscopic picture signal configured by alternately arranging the left-eye picture stream and the right-eye picture stream which have a parallax therebetween. More specifically, the digital tuner 21 of the signal processing section 20 selects a desired signal (stream) from broadcast waves (the input signal Din) received by the antenna and supplied through the antenna terminal TA. The MPEG decoder 22 extracts the picture signal and the audio signal from the stream selected by the digital tuner 21. The picture signal processing circuit 23 performs picture signal processing on the picture signal extracted by the MPEG decoder 22, and generates the synchronization control signal Sync. The graphic generation circuit 24 generates OSD information, and superimposes the OSD information on a picture supplied from the picture signal processing circuit 23 to generate the picture signal D1. The audio signal processing circuit 25 performs audio signal processing on the audio signal extracted by the MPEG decoder 22 to generate the audio signal D2. The display drive section 11 drives the display section 12 in response to the picture signal D1. The display section 12 alternately displays the left-eye picture stream and the right-eye picture stream in response to a signal supplied from the display drive section 11. The audio amplification section 13 amplifies the audio signal D2, and drives the speaker 14. The speaker 14 outputs the audio signal as sound.

The shutter control section 15 generates the shutter control signal CTL in synchronization with displaying of the left-eye picture stream and the right-eye picture stream on the display 10 based on the synchronization control signal Sync supplied from the picture signal processing circuit 23 to supply the shutter control signal CTL to the shutter eyeglass device 60 through radio communication.

The reception section 61 of the shutter eyeglass device 60 receives the shutter control signal CTL supplied from the shutter control section 15 through radio communication. The determination circuit 62 interprets the control code (the bit pattern representing as a whole of the command set CS) of the shutter control signal CTL received by the reception section 61 to determine the open/close instructions to the left-eye shutter 6L and the right-eye shutter 6R. More specifically, the determination circuit 62 performs pattern-matching between the bit pattern representing as a whole of the command set CS received and the bit pattern in a corresponding transmission mode which is held in the bit pattern holding section 63. The shutter drive circuit 64 generates the left-eye shutter control signal CTLL and the right-eye shutter control signal CTLR based on a signal (a signal representing a determination result) supplied from the determination circuit 62 to supply the left-eye shutter control signal CTLL and the right-eye shutter control signal CTLR to the left-eye shutter 6L and the right-eye shutter 6R, respectively. The left-eye shutter 6L performs the open/close operation in response to the left-eye shutter control signal CTLL, and the right-eye shutter 6R performs the open/close operation in response to the right-eye shutter control signal CTLR.

Figure 7A:
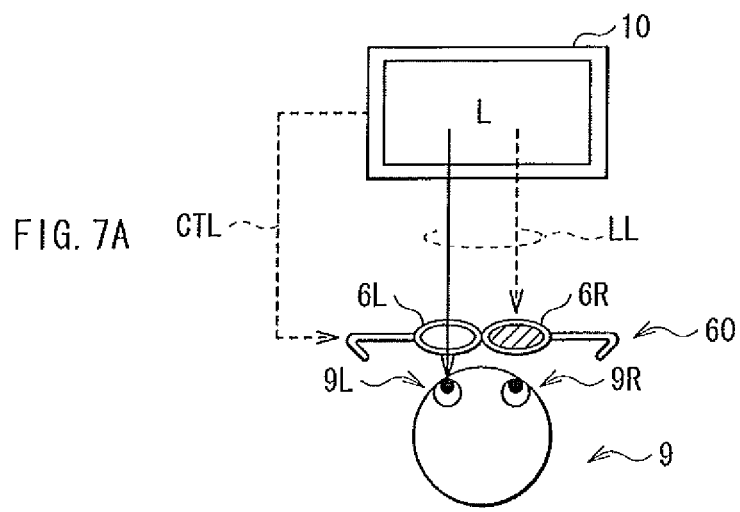
FIGS. 7A and 7B are schematic views illustrating an operation example of the display system illustrated in FIG. 1.
Figure 7B:
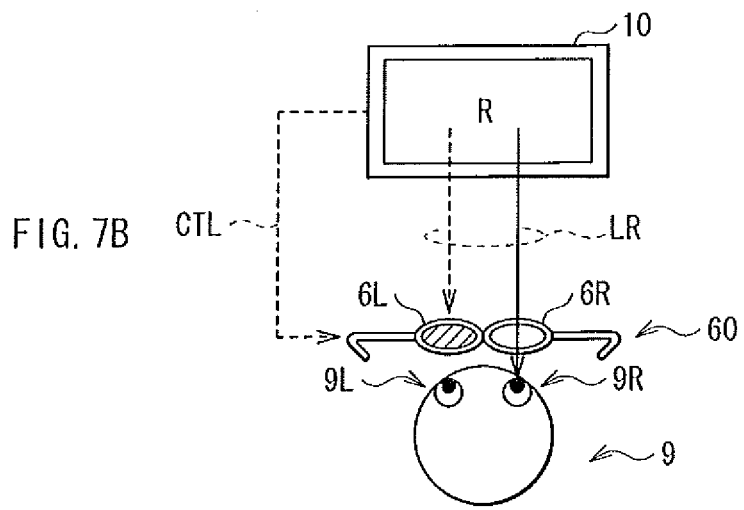

FIGS. 7A and 7B schematically illustrate a whole operation of the display system 1. FIG. 7A illustrates an operation when the left-eye picture L is displayed (when display light LL is emitted), and the FIG. 7B illustrates an operation when the right-eye picture R is displayed (when display light LR is emitted).

When the display 10 displays the left-eye picture L, in the shutter eyeglass device 60, as illustrated in FIG. 7A, the left-eye shutter 6L is turned into an open state, and the right-eye shutter 6R is turned into a close state. At this time, a viewer 9 watches the left-eye picture L with his left eye 9L. On the other hand, when the display 10 displays the right-eye picture R, in the shutter eyeglass device 60, as illustrated in FIG. 7B, the left-eye shutter 6L is turned into a close state, and the right-eye shutter 6R is turned into an open state. At this time, the viewer 9 watches the right-eye picture R with his right eye 9R. When these operations are alternately repeated, as the left-eye picture L and the right-eye picture R have a parallax therebetween, the viewer 9 is allowed to perceive a picture configured of these pictures as a stereoscopic picture with a depth.

2. Generation and transmission/reception of shutter control signal CTL

Next, referring to FIGS. 8 to 13, the generation of the shutter control signal CTL by the signal processing section 20 and the shutter control section 15 and the transmission/reception operation of the shutter control signal CTL by the shutter control section 15 and the shutter eyeglass device 60 will be described in detail below.

2-1. Operation of generating synchronization control signal sync by signal processing section 20

First, the picture signal processing circuit 23 in the signal processing section 20 generates the synchronization control signal Sync based on, for example, information or switching timings of picture signals (a left-eye picture signal and a right-eye picture signal), an instruction through a remote control signal RS from a user, or the like.

Figure 8:
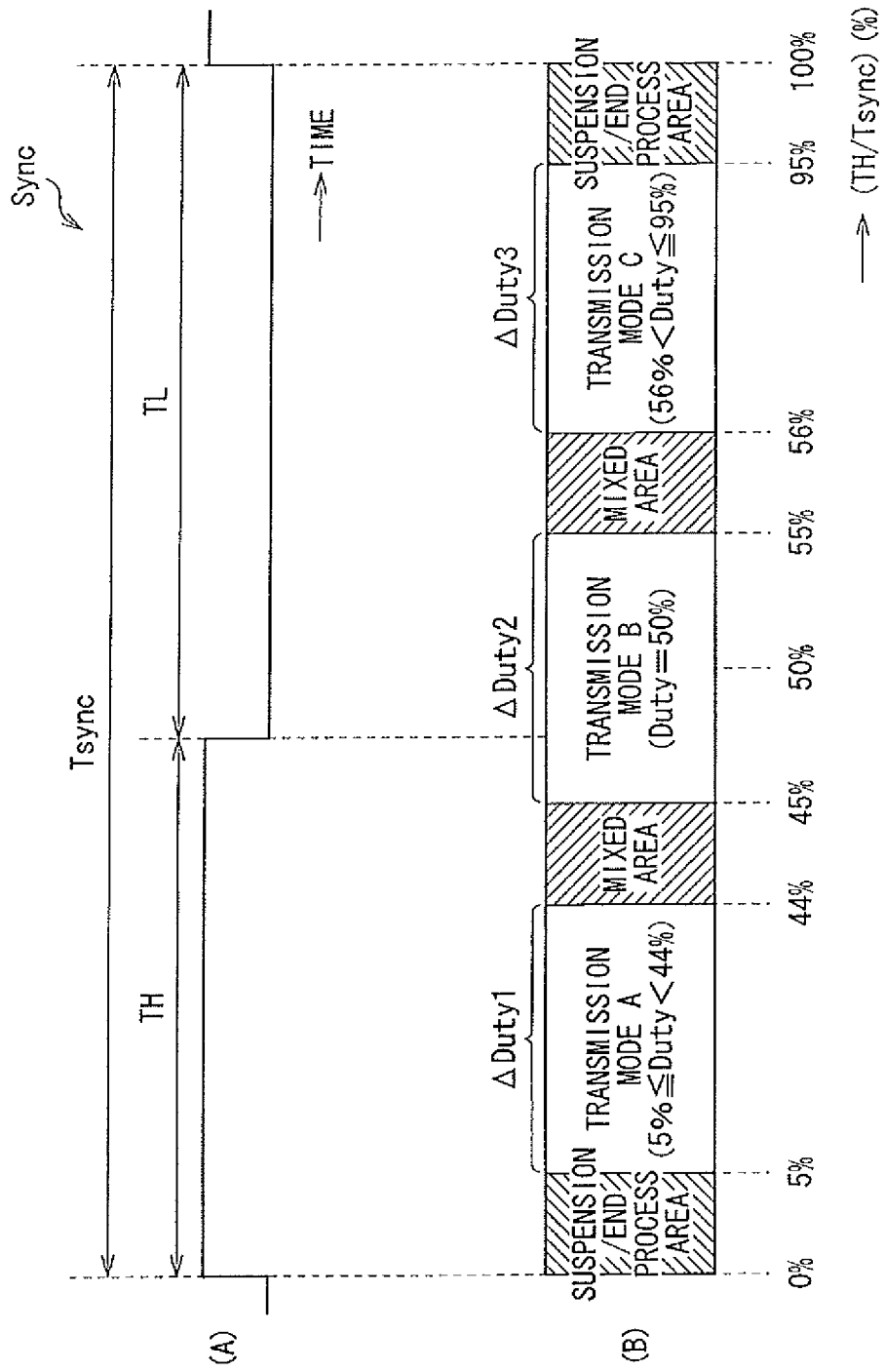

FIG. 8 illustrates an example of a relationship between the synchronization control signal Sync generated in such a manner and transmission modes or the like in the above-described shutter control signal CTL.

As illustrated in a part (A) in FIG. 8, the synchronization control signal Sync is a signal represented by binary logic. More specifically, in the synchronization control signal Sync, in a first half of one cyclic period (for example, approximately 100 ms to 4 ms), an H-period TH in which a logical level is "H (high)" is provided, and in a latter half of the one cyclic period, an L-period TL in which a logical level is "L (low)" is provided. However, as will be described later, basically, the duty ratio (TH/Tsync) (%) of the synchronization control signal Sync is allowed to have an arbitrary value ranging from 0% to 100% (in an example illustrated in the part (A) in FIG. 8, for example, the duty ratio is approximately 48%). Moreover, the duty ratio (TH/Tsync) of the synchronization control signal Sync basically defines an open duty ratio Duty (%) representing a relative open period length (open period length) of each of the left-eye shutter 6L and the right-eye shutter 6R.

Moreover, for example, as illustrated in a part (B) in FIG. 8, the transmission modes or the like in the shutter control signal CTL are determined depending on the magnitude of the duty ratio (TH/Tsync) (%) of the synchronization control signal Sync (the magnitude of the above-described open duty ratio Duty (%) of the left-eye shutter 6L and the right-eye shutter 6R). In other words, a plurality of transmission modes correspond to duty ratio sections ΔDuty1 to ΔDuty3 sectioned by dividing a range of the open duty ratio Duty (%) (the range of the duty ratio (TH/Tsync) (%) of the synchronization control signal Sync).

More specifically, in this case, when the duty ratio (TH/Tsync) of the synchronization control signal Sync is within a range from 5% to smaller than 44% (a duty ratio section ΔDuty1), the transmission mode is turned into a transmission mode A (5%≤Duty<44%) which will be described later. Moreover, when the duty ratio (TH/Tsync) of the synchronization control signal Sync is within a range from 45% to 55% both inclusive (a duty ratio section ΔDuty2), the transmission mode is turned into a transmission mode B (Duty=50%) which will be described later. When the duty ratio (TH/Tsync) of the synchronization control signal Sync is within a range from larger than 56% to 95% (a duty ratio section ΔDuty3), the transmission mode is turned into a transmission mode C (56%<Duty≤95%) which will be described later. In other words, in the transmission modes A and C, the value of the duty ratio (TH/Tsync) of the synchronization control signal Sync is equal to the value of the open duty ratio Duty (the open duty ratio Duty is a variable value). On the other hand, in the transmission mode B, irrespective of the value of the duty ratio (TH/Tsync) of the synchronization control signal Sync, the value of the open duty ratio Duty is a fixed value (50%).

When the duty ratio (TH/Tsync) of the synchronization control signal Sync is smaller than 5% or larger than 95%, the mode is turned into a mode where a suspension/end process which will be described later is performed. Moreover, the duty ratio (TH/Tsync) of the synchronization control signal Sync is within a range from 44% to smaller than 45%, or within a range from larger than 55% to 56%, the mode is turned into a mode where a mixed area process which will be described later is performed.

The duty ratio (TH/Tsync) of the synchronization control signal Sync is set by the picture signal processing circuit 23 in such a manner based on information or switching timings of the picture signals, an instruction through a remote control signal RS from a user, or the like to generate the synchronization control signal Sync.

2-2. Operation of generating and transmitting shutter control signal CTL by shutter control section 15

Next, the shutter control section 15 generates the command set CS configured by combining, in predetermined order, shutter control commands CMD of one or more kinds (herein, two kinds) selected from the above-described plurality of shutter control commands CMD based on the synchronization control signal Sync generated in such a manner. Then, the generated command set CS is repeatedly transmitted to the shutter eyeglass device 60 to perform an operation of transmitting the shutter control signal CTL.

Specifically, the shutter control signal generation section 151 in the shutter control section 15 generates the shutter control signal CTL based on the synchronization control signal Sync to supply the shutter control signal CTL to the transmission section 153. More specifically, first, the shutter control signal generation section 151 selects one transmission mode from a plurality of transmission modes depending on the value of the duty ratio (TH/Tsync) of the synchronization control signal Sync (or selects one of the above-described other process modes in some cases). In other words, for example, as illustrated in the part (B) in FIG. 8, when the duty ratio (TH/Tsync) of the synchronization control signal Sync is within a range from 5% to smaller than 44%, the transmission mode A (5%≤Duty<44%) is selected. Likewise, when the duty ratio (TH/Tsync) of the synchronization control signal Sync is within a range from 45% to 55% both inclusive, the transmission mode B (Duty=50%) is selected. When the duty ratio (TH/Tsync) of the synchronization control signal Sync is with a range from larger than 56% to 95%, the transmission mode C (56%<Duty≤95%) is selected.

Next, the shutter control signal generation section 151 generates the shutter control signal CTL including the command set CS provided for the selected transmission mode which will be described later referring to FIGS. 10 to 13 with use of the plural kinds of shutter control commands CMD held in the bit pattern holding section 152. At this time, the shutter control signal generation section 151 sets the bit pattern of the command set CS (the arrangement sequence of the shutter control command CMDs) so that a bit pattern representing as a whole of the command set CS is the same as the bit pattern held in the bit pattern holding section 63 in the shutter eyeglass device 60 which will be described later. Then, the shutter control signal CTL including the command set CS generated in such a manner is transmitted from the transmission section 153 to the shutter eyeglass device 60.

Figure 9:
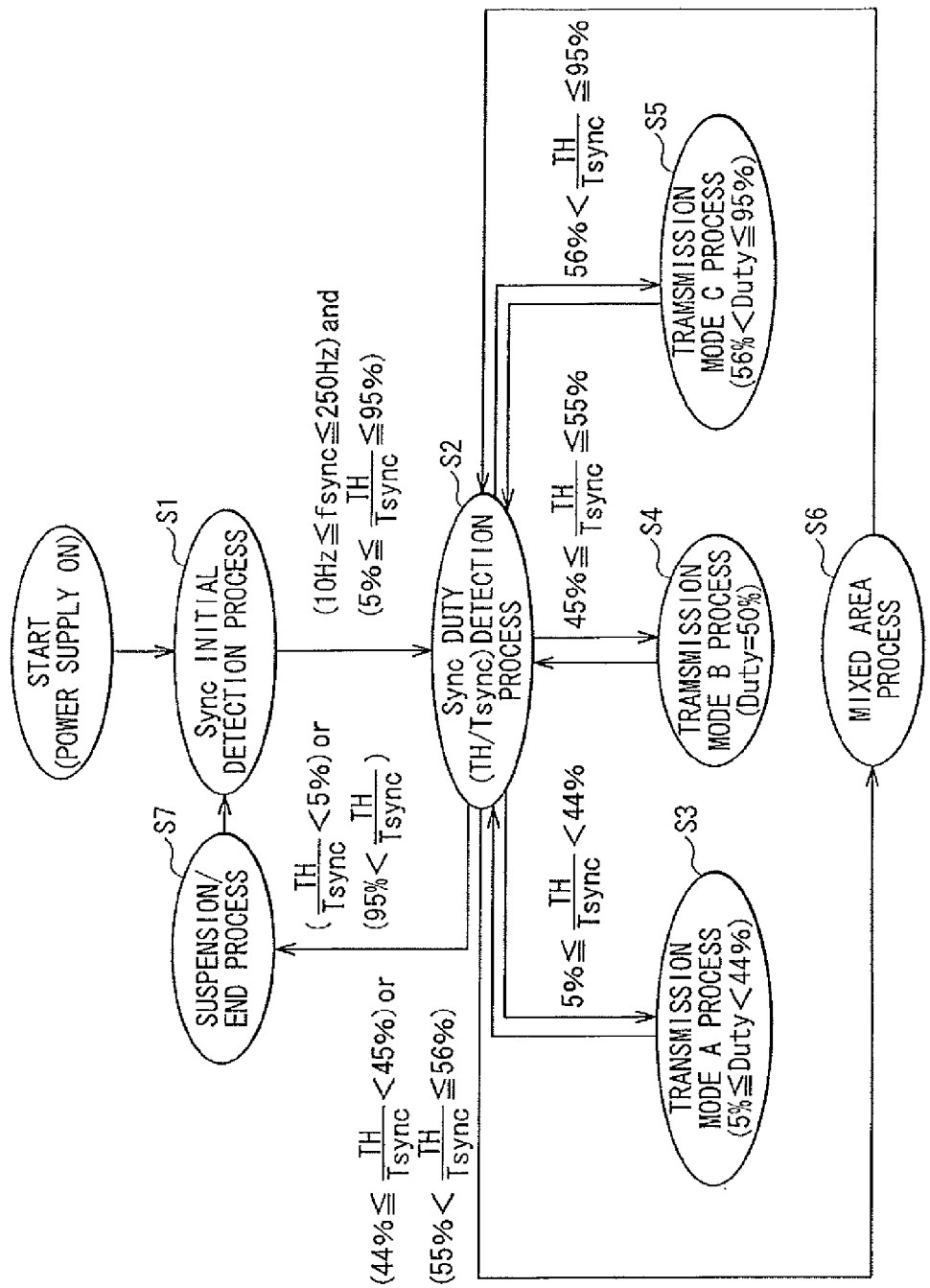
FIG. 9 is a state transition diagram illustrating an operation example of the display system illustrated in FIG. 1.

FIG. 9 illustrates a state transition diagram of an example of a mode selection operation according to the value of the duty ratio (TH/Tsync) of the synchronization control signal Sync in the shutter control signal generation section 151, and corresponds to an operation illustrated in the part (B) in FIG. 8.

First (when the power supply of the display 10 is turned on), the shutter control signal generation section 151 performs an initial detection process of the synchronization control signal Sync (step S1 in FIG. 9). More specifically, the shutter control signal generation section 151 determines whether the values of the frequency fsync and the duty ratio (TH/Tsync) of the synchronization control signal Sync are within predetermined ranges for performing a transmission operation (or the mixed area process) in a steady state which will be described later (a normal state when displaying a stereoscopic picture) (the transmission modes A to C).

More specifically, in the case where the value of the frequency fsync is within a range from 10 Hz to 250 Hz both inclusive, and the value of the duty ratio (TH/Tsync) is within a range of 5% to 95% both inclusive, the operation is shifted to the following Sync duty ratio (TH/Tsync) detection process (step S2). On the other hand, when one or both of the values of the frequency fsync and the duty ratio (TH/Tsync) are out of the ranges, the initial detection process continues until both of the values reach the ranges.

Next, the shutter control signal generation section 151 performs a detection process of the duty ratio (TH/Tsync) of the synchronization control signal Sync (step S2). Then, as described above, one transmission mode is selected from the plurality of transmission modes A to C according to the value of the duty ratio (TH/Tsync) to perform a transmission operation. In other words, a transmission mode A process (step S3), a transmission mode B process (step S4) or a transmission mode C process (step S5) is selected to perform the transmission operation. Alternatively, one of the other process modes (the mixed area process (step S6) and the suspension/end process (step S7)) is performed depending on the value of the duty ratio (TH/Tsync).

More specifically, when the duty ratio (TH/Tsync) of the synchronization control signal Sync is within a range from 5% to smaller than 44%, the transmission mode A process (5%≤Duty<44%) is selected. Moreover, when the duty ratio (TH/Tsync) of the synchronization control signal Sync is within a range from 45% to 55% both inclusive, the transmission mode B process (Duty=50%) is selected. When the duty ratio (TH/Tsync) of the synchronization control signal Sync is within a range from larger than 56% to 95%, the transmission mode C process (56%<Duty≤95%) is selected. On the other hand, when the duty ratio (TH/Tsync) of the synchronization control signal Sync is smaller than 5% or larger than 95%, the suspension/end process is selected. Moreover, when the duty ratio (TH/Tsync) of the synchronization control signal Sync is within a range from 44% to smaller than 45% or within a range from larger than 55% to 56%, the mixed area process is selected.

Operation in steady state

The transmission operation in the steady state (the transmission modes A to C) will be described in detail below.

Figure 10:
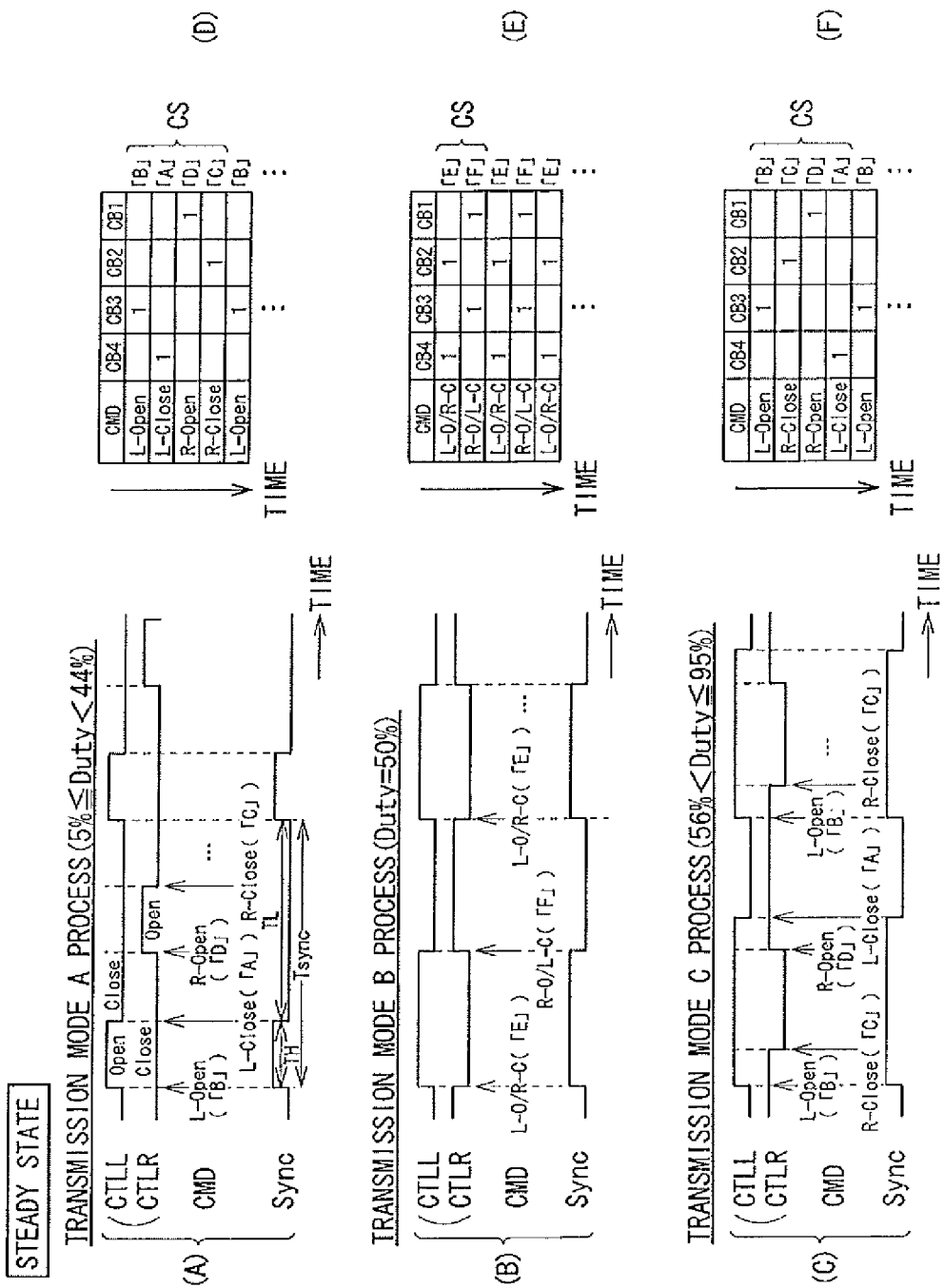
FIG. 10 is a timing chart illustrating an operation example in a steady state in the display system illustrated in FIG. 1.
Figure 11:
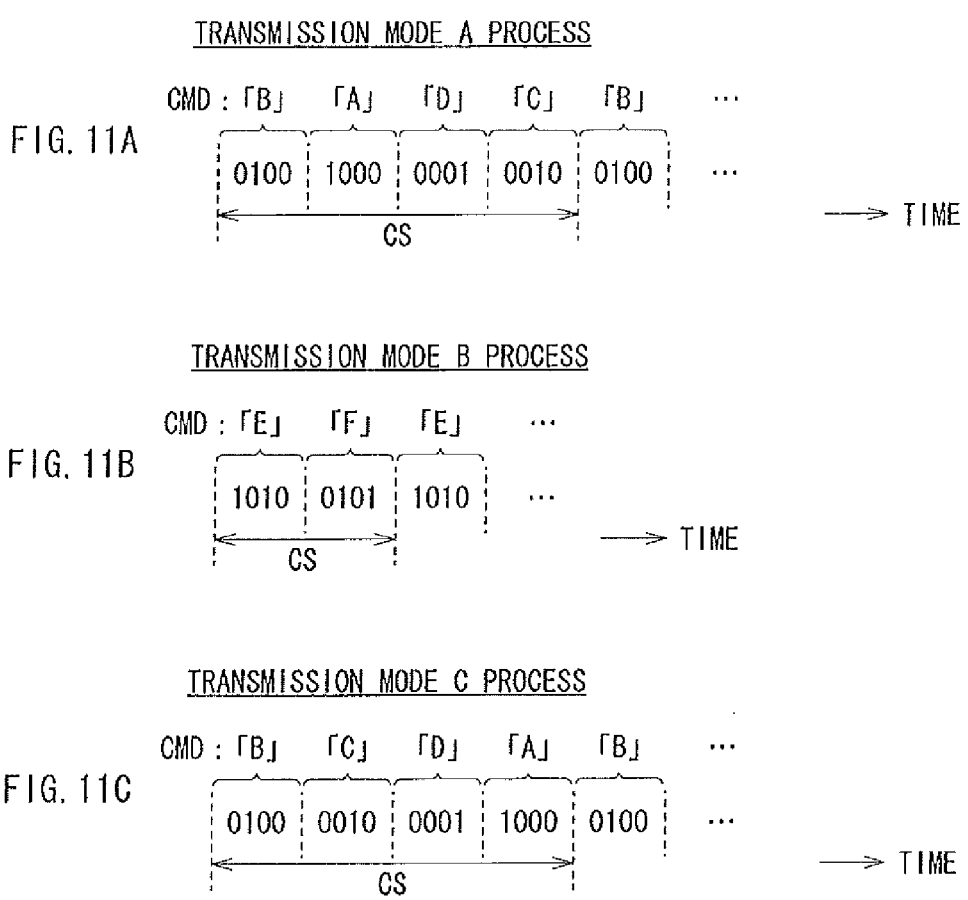
FIG. 11 is a timing chart illustrating a command set and a bit pattern in the operation example illustrated in FIG. 10.

FIG. 10 illustrates a timing chart of an operation example in the steady state. In FIG. 10 (and FIGS. 12 and 13 which will be described later), parts (A) and (D) indicate an operation in the transmission mode A process, parts (B) and (E) indicate an operation in the transmission mode B process, and parts (C) and (F) indicate an operation in the transmission mode C process. Moreover, the parts (A) to (C) indicate timing waveforms (pulse waveforms) of the left-eye shutter control signal CTLL and the right-eye shutter control signal CTLR generated based on the shutter control signal CTL, the description (corresponding to "A" to "F" in FIG. 6B) of the shutter control command CMD included in the shutter control signal CTL and the timing waveform (pulse waveform) of the synchronization control signal Sync in order from the top in the drawing. On the other hand, the parts (D) to (F) indicate the arrangement sequence along a time axis of each shutter control command CMD configuring the command set CS, the descriptions ("A" to "F") of the shutter control commands CMD, and logical values of bits (CB4 to CB1) of the command bit CB. However, for the sake of simplification of the drawing, in "E" and "F" in the shutter control commands, "L-Open/R-Close" and "R-Open/L-Close" in FIG. 6B are represented by "L-O/R-C" and "R-O/L-C", respectively. Likewise, as the logical values of the bits CB4 to CB1 of the command bit CB, only "1" is illustrated, and "0" is not illustrated. As illustrated in the parts (A) to (C), in this case, when the left-eye shutter control signal CTLL is in a "H" level, the left-eye shutter 6L is turned into an open state, and when the left-eye shutter control signal CTLL is in a "L" level, the left-eye shutter 6L is turned into a close state. Likewise, when the right-eye shutter control signal CTLR is in an "H" level, the right-eye shutter 6R is turned into an open state, and when the right-eye shutter control signal CTLR is in an "L" level, the right-eye shutter 6R is turned into a close state First, in the transmission mode A process illustrated in the parts (A) and (D) in FIG. 10, the open duty ratio Duty is within a range of 5%≤open duty ratio Duty<44%, so "B" (L-Open), "A" (L-Close), "D" (R-Open) and "C" (R-Close) as the shutter control commands CMD are repeated in this order. Therefore, as illustrated in the part (D) in FIG. 10 and FIG. 11A, the command set CS at this time includes four shutter control commands CMD in order of "B", "A", "D" and "C". Then, the bit pattern representing as a whole of the command set CS is "0100100000010010" as illustrated in FIG. 11A.

Moreover, in the transmission mode B process illustrated in the parts (B) and (E) in FIG. 10, as the open duty Duty is 50%, as illustrated in the part (B) in FIG. 10, operation switching of the left-eye shutter 6L and the right-eye shutter 6R is performed at the same timing. Therefore, in the transmission mode B process, complex commands are used, and "E" (L-Open/R-Close) and "F" (R-Open/L-Close) as the shutter control commands CMD are repeated in this order. Therefore, the command set CS at this time is configured by alternately arranging two shutter control commands CMD (two complex commands) in order of "E" and "F" as illustrated in the part (E) in FIG. 10 and FIG. 11A. Then, the bit pattern representing as a whole of the command set CS is "10100101" as illustrated in FIG. 11B.

Further, in the transmission mode C process illustrated in the parts (C) and (F) in FIG. 10, the open duty ratio Duty is within a range of 56%<open duty ratio Duty≤95%, so "B" (L-Open), "C" (R-Close), "D" (R-Open) and "A" (L-Close) as the shutter control commands CMD are repeated in this order. Therefore, the command set CS at this time is configured by arranging four shutter control commands CMD in order of "B", "C", "D" and "A" as illustrated in the part (F) in FIG. 10 and FIG. 11C. Then, the bit pattern representing as a whole of the command set CS is "0100001000011000" as illustrated in FIG. 11C.

In the embodiment, respective command sets CS configured of different bit patterns are generated for a plurality of transmission modes (in this case, three transmission modes A to C), and the command sets CS are included in the shutter control signal CTL and are repeatedly transmitted.

Operation in start process

Next, an operation in a predetermined start process which is not illustrated in the part (B) in FIG. 8 and FIG. 9 will be described below. The start process is a process performed when the power supply of the display 10 is turned on or when the display 10 changes its display mode from a two-dimensional display mode to a three-dimensional (stereoscopic picture) display mode.

Figure 12:
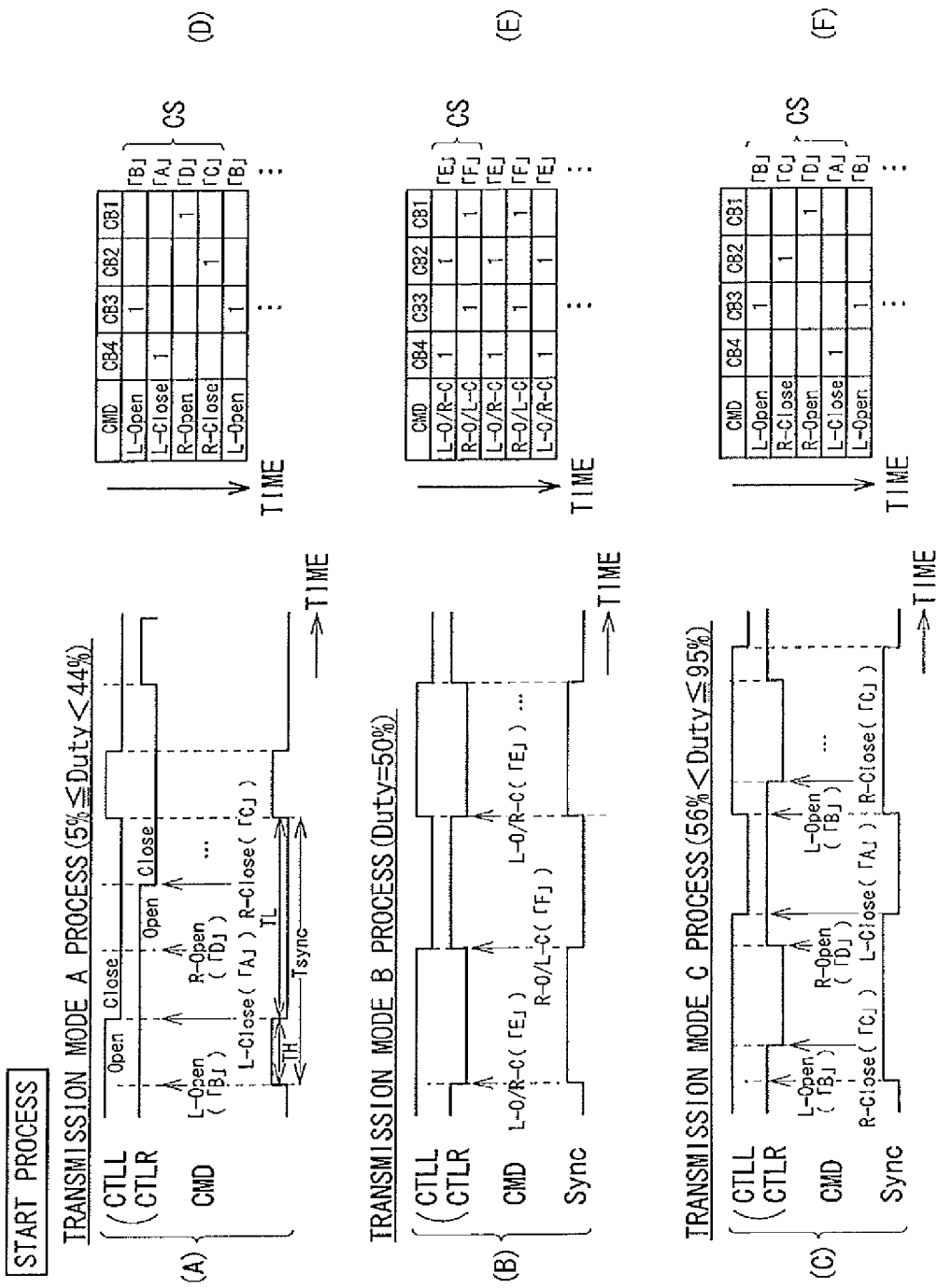
FIG. 12 is a timing chart illustrating an operation example in a start process in the display system illustrated in FIG. 1.

More specifically, for example, as illustrated in parts (A) to (C) in FIG. 12, a transmission operation in each transmission mode process (the transmission mode A process, the transmission mode B process, the transmission mode C process) in the start process is basically the same as the transmission operation in the steady state illustrated in the parts (A) to (C) in FIG. 10. In other words, the bit pattern of the command set CS in each transmission mode is the same as that in the steady state illustrated in FIGS. 11A to 11C. However, as illustrated in the parts (A) to (C) in FIG. 12, before changing to the three-dimensional display mode (in the two-dimensional display mode), both of the left-eye shutter 6L and the right-eye shutter 6R are in an open state.

In the start process, when the shutter eyeglass device 60 determines that the bit pattern in the command set CS is repeatedly received a plurality of times, the shutter eyeglass device 60 recognizes an instruction for changing the display mode, and starts an operation in the three-dimensional display mode.

Operation in mixed area process

Next, an operation in the mixed area process (step S6 in FIG. 9) will be described below. The mixed area process is a process which is basically not used, but if the operation is changed to this process according to the value of the duty ratio (TH/Tsync) of the synchronization control signal Sync, the operation is performed as follows. In the mixed area process, the bit pattern of the command set CS is not changed from a preceding transmission mode process (the transmission mode A process, the transmission mode B process or the transmission mode C process), and only the transmission timing of the shutter control command CMD is set according to the value of the open duty ratio Duty.

Operation in suspension/end process

Next, an operation in the suspension/end process (step S7 in FIG. 9) will be described in detail below. The suspension/end process is, for example, a process performed when the display 10 changes its display mode from the three-dimensional (stereoscopic) display mode to the two-dimensional display mode.

As illustrated in the part (B) in FIG. 8 and FIG. 9, the suspension/end process is performed when the H-period TH is not sequentially detected in a certain period (for example, 100 ms) or over in the synchronization control signal Sync in addition to when the duty ratio (TH/Tsync) of the synchronization control signal Sync is smaller than 5% or larger than 95%. In other words, the shutter control signal generation section 151 determines the generation and transmission of a stop command set SCf which will be described later based on a value or a logical level of the duty ratio (TH/Tsync) of the synchronization control signal Sync in the sync duty ratio (TH/Tsync) detection process (step S2 in FIG. 9). The stop command set CSf is configured with use of some of the plural kinds of the shutter control commands CMD, and is a command set for stopping open/close drive of the left-eye shutter 6L and the right-eye shutter 6R so that the left-eye shutter 6L and the right-eye shutter 6R are in an open state.

Figure 13:
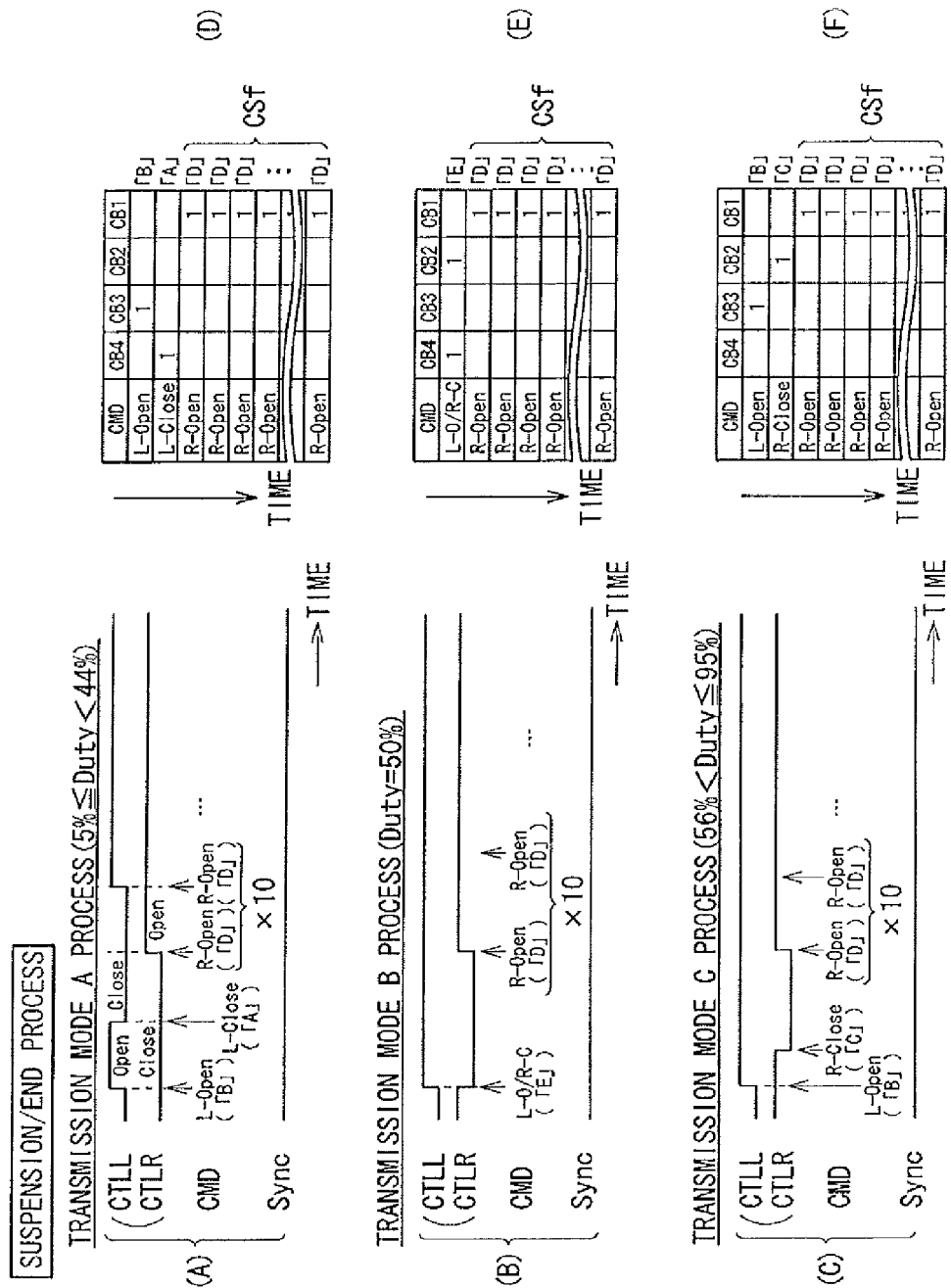
FIG. 13 is a timing chart illustrating an operation example in a suspension/end process in the display system illustrated in FIG. 1.

Specifically, for example, as illustrated in parts (A) to (C) in FIG. 13, the shutter control signal generation section 151 performs the generation/transmission operation of the stop command set CSf. In other words, while maintaining the setting of the transmission timings of the shutter control commands CMD depending on the value of the open duty ratio Duty in a preceding transmission mode process (the transmission mode A process, the transmission mode B process or the transmission mode C process), a common stop command set CSf to the transmission modes is generated.

More specifically, at this time, "D" (R-Open) and "D" (R-Open) as the shutter control commands CMD are repeated in this order a plurality of times (in this case, ten times). Therefore, as illustrated in the parts (A) to (F) in FIG. 13, in the stop command set CSf, a combination of two shutter control commands CMD of the same kind, that is, "D" and "D" is repeated 10 times (that is, "D" is repeated 20 times). Then, the bit pattern representing as a whole of the command set CS is 10-times repetition of "00010001" as illustrated in FIG. 11C. When two commands of the same kind are combined into one set, and the set is transmitted a plurality of times (10 times), resistance to external noise is allowed to be increased; therefore, a malfunction is preventable. More specifically, a possibility that due to external noise, "B", "A" and "C" with different cycles are lost and only "D" is repeatedly transmitted while "B", "A", "D" and "C" are transmitted in the steady state is much reduced. Therefore, highly reliable communication between a transmission side and a reception side is achievable. In this case, the stop command set CSf configured by repeating "D" (R-Open) as the shutter control command CMD a plurality of times is described as an example; however, the stop command set CSf may be configured by repeating any other one of the plural kinds of shutter control commands CMD a plurality of times.

Thus, in the embodiment, the shutter control section 15 generates the command set CS (or the command set Csf, the same applies hereinafter) configured by combining, in predetermined order, the shutter control commands CMD of one or more kinds selected from the plural kinds of the shutter control commands CMD based on the synchronization control signal Sync. Then, the transmission operation of the shutter control signal CTL is performed by repeatedly transmitting the generated command set CS to the shutter eyeglass device 60. Moreover, at this time, the bit pattern of the command set CS is set so that the bit pattern representing as a whole of the command set CS is the same as the bit pattern held in the shutter eyeglass device 60 which will be described later.

2-3. Reception operation of shutter control signal CTL by shutter eyeglass device 60

Next, in the shutter eyeglass device 60, the reception section 61 receives the shutter control signal CTL including the command set CS which is repeatedly transmitted from the shutter control section 15 in such a manner. Then, the determination circuit 62 interprets the control code (the bit pattern representing as a whole of the command set CS) of the received shutter control signal CTL to determine the open/close instructions to the left-eye shutter 6L and the right-eye shutter 6R. More specifically, the determination circuit 62 performs pattern-matching between the bit pattern representing as a whole of the command set CS received and the bit pattern in a corresponding transmission mode held in the bit pattern holding section 63.

More specifically, in the embodiment, the bit pattern holding section 63 holds the same bit pattern as the bit pattern representing as a whole of the command set CS which is expected (assumed) to be received by the reception section 61. In other words, the bit pattern holding section holds the same bit pattern as that of the bit pattern holding section 152 in the shutter control section 15 in advance. More specifically, in the command set CS repeatedly transmitted from the display 10, the bit pattern representing as a whole of the command set CS is the same as the bit pattern held in the shutter eyeglass device 60. Therefore, when the shutter control signal CTL including the command set CS is transmitted from the transmission side (the display 10) to the reception side (the shutter eyeglass device 60), the shutter eyeglass device 60 easily determines whether the command set CS includes external noise.

The determination circuit 62 performs pattern-matching between the bit patterns in the following manner. First, when switching the transmission mode or the like, the determination circuit 62 determines that the shutter control signal CTL including a normal command set CS is received when it is sequentially confirmed that the bit patterns of a plurality of command sets CS are the same as the bit pattern held in the bit pattern holding section 63. On the other hand, in the case where the received command set CS includes a bit pattern different from the bit pattern held in the bit pattern holding section 63, the determination circuit 62 determines that the shutter control signal CTL including the command set CS includes external noise. Note that after every switching the transmission mode, the determination circuit 62 performs pattern-matching between the bit pattern of each command set CS and the bit pattern held in the bit pattern holding section 63.

Alternatively, for example, the determination circuit 62 may perform determination on the received command set CS in the following manner. In the case where more than 2 bits (3 bits or more) of "1" in the command bit CB (CB4 to CB1) configured of four bits are received, the bit pattern of the command bit CB is different from any of the shutter control commands CMD illustrated in FIG. 6B; therefore, the determination circuit 62 determines that the shutter control signal CTL includes external noise. Moreover, in the case where any other bit pattern is received without receiving the start bit SB functioning as a preamble, the determination circuit 62 determines that the shutter control signal CTL includes external noise. In these cases, for example, the received command set CS is cancelled, and the open/close operations of shutters in the shutter eyeglass device 60 are performed (self-performed) according to the command set CS received immediately before receiving the cancelled command set CS. Moreover, in the case where the transmission of the shutter control signal CTL from the display 10 is interrupted, for example, the open/close operations of the shutters in the shutter eyeglass device 60 are self-performed for a certain period (for example, a few seconds), and after that, the shutter eyeglass device 60 is turned into a standby state.

Moreover, in the command sets CS (except for the stop command set CSf) in the embodiment, for example, as illustrated in FIGS. 10 to 13, the position of a bit indicating "1" (indicating an effective state) is inevitably changed from a shutter control command CMD to an adjacent shutter control command CMD in order from a higher-order bit to a lower-order bit or from a lower-order bit to a high-order bit. Alternatively, in the case of two complex commands, adjacent bits are changed. Thus, in the command set CS, the position of a bit representing "1" is set to be changed from a shutter control command CMD to an adjacent shutter control command CMD with predetermined regularity. More specifically, in this case, in adjacent shutter control commands CMDs, "1" is not placed in the same bit position. Therefore, when the command set CS configured of such a bit pattern is transmitted and received, an effect of easily determining that a bit which is not placed with the regularity is noise is obtained.

Further, for example, as illustrated in FIG. 13, the stop command set CSf in the embodiment has a bit pattern in which basically the shutter control command CMD of one and the same kind is repeated at different intervals (timings). Therefore, when the stop command set CSf configured of such a bit pattern is transmitted and received, an effect of allowing a malfunction due to a loss of the shutter control command CMD in the steady state to be prevented is obtained.

As described above, in the embodiment, in the command set CS repeatedly transmitted from the shutter control section 15 in the display10, the bit pattern representing as a whole of the command set CS is the same as the bit pattern held in the shutter eyeglass device 60; therefore, when the shutter control signal CTL including the command set CS is transmitted from the transmission side (the display 10) to the reception side (the shutter eyeglass device 60), the reception side is allowed to easily determine whether the command set CS includes external noise. Therefore, the influence of such external noise is allowed to be reduced or prevented easily, and highly reliable communication between the transmission side and the reception side is achievable.

Modifications

Next, modifications (Modifications 1 and 2) of the above-described embodiment will be described below. Note that like components are denoted by like numerals as of the above-described embodiment and will not be further described.

Modification 1

Figure 14:
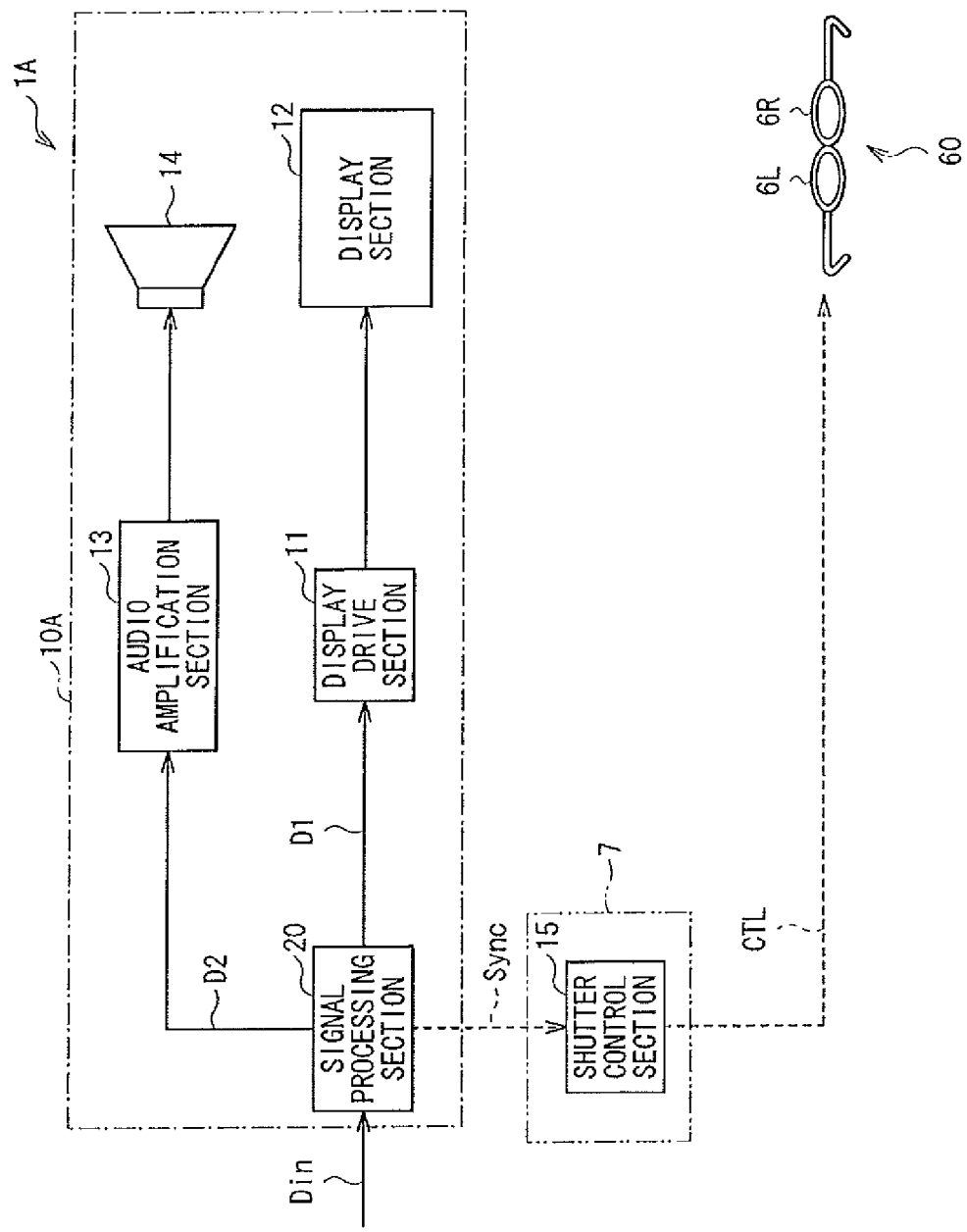
FIG. 14 is a block diagram illustrating a configuration example of a display system according to Modification 1 of the invention.

FIG. 14 illustrates a whole configuration of a display system (a display system 1A) according to Modification 1. As in the case of the display system 1 according to the embodiment, the display system 1A is a stereoscopic display system performing stereoscopic display. The display system 1A includes a display 10A, a transmitter 7 including the shutter control section 15 and the shutter eyeglass device 60. In other words, in the display system 1 according to the above-described embodiment, the shutter control section 15 as the transmitter (the transmission section) is incorporated in the display 10; however, in the display system 1A, the shutter control section 15 is arranged outside the display 10A (externally arranged). Note that other configurations are the same as those in the above-described embodiment.

The transmitter 7 and the shutter eyeglass device 60 correspond to specific examples of "a transmission/reception system" in the invention.

As in the case of the modification, even in the display system 1A in which the shutter control section as the transmitter (the transmission section) is arranged separately from the display 10A, and the transmission/reception system, the same effects as those in the above-described embodiment are obtainable by the same function as those in the above-described embodiment.

Modification 2

Figure 15:
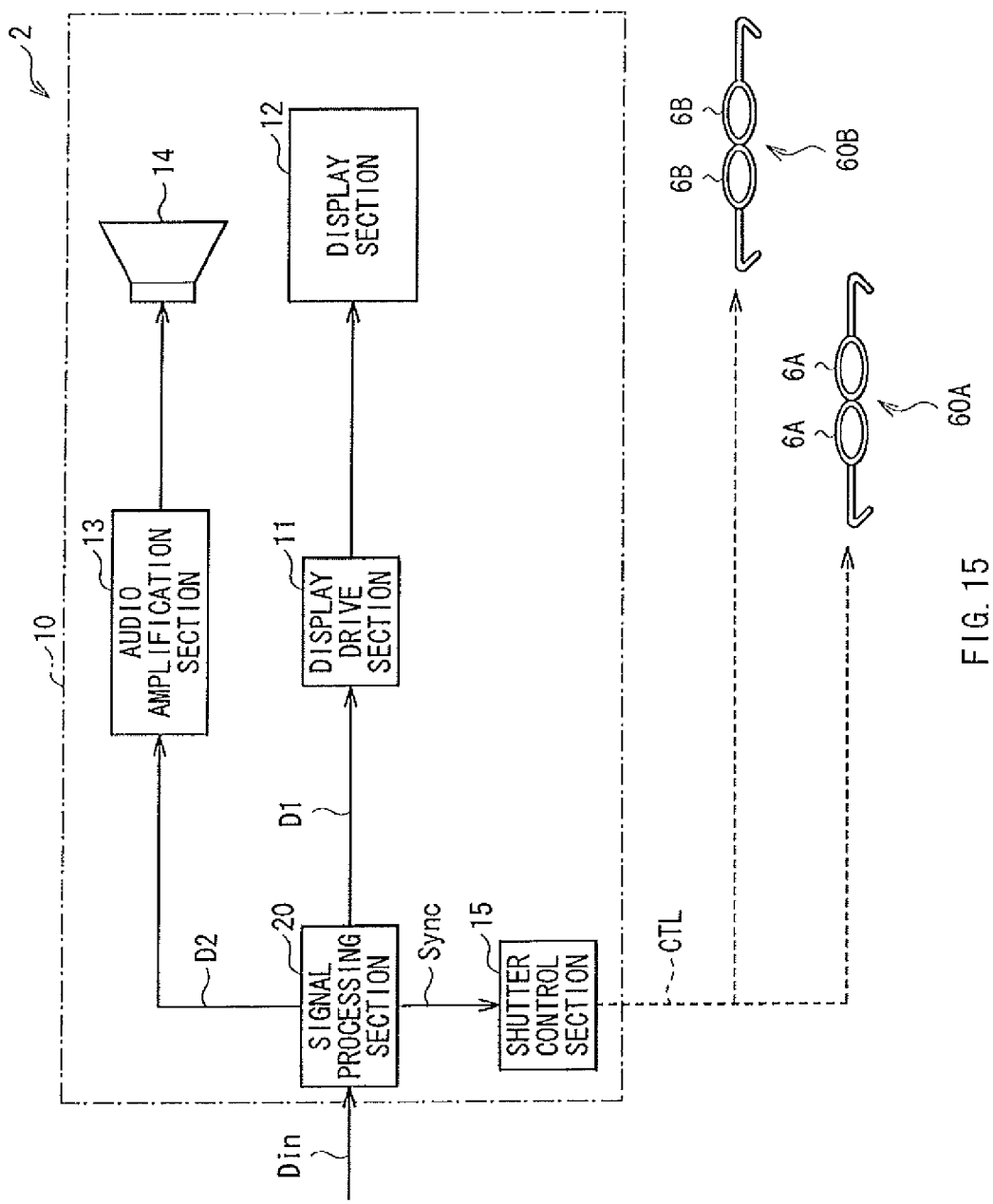
FIG. 15 is a block diagram illustrating a configuration example of a display system according to Modification 2 of the invention.

FIG. 15 illustrates a whole configuration of a display system (a display system 2) according to Medication 2. The display system 2 is a multi-view system for a plurality of viewers to watch different pictures displayed on one display 10. In other words, the above-described embodiment and the above-described Modification 1 each are a stereoscopic display system alternately displaying a left-eye picture stream and a right-eye picture stream which have a parallax therebetween as plural kinds of pictures in a time-divisional manner. On the other hand, the modification is a multi-view system alternately displaying a plurality of different kinds of pictures in a time-divisional manner.

In the modification, a shutter eyeglass device is different from that in the above-described embodiment and Modification 1. More specifically, in the above-described embodiment (refer to FIG. 1) and Modification 1 (refer to FIG. 14), the open/close operations of the right-eye shutter 6R and the left-eye shutter 6L are separately instructed. On the other hand, in the modification, the open/close operations of a plurality of shutter eyeglass devices are instructed from one shutter eyeglass device to another (from one pair of the right-eye shutter and the left-eye shutter to another). Other configurations are the same as those in the above-described embodiment. The multi-view system for two viewers will be described below as an example.

Configuration of Display System 2

The display system 2 according to the modification includes the display 10 and two shutter eyeglass devices 60A and 60B as illustrated in FIG. 15.

The display 10 is the same as the display 10 (refer to FIG. 2) according to the above-described embodiment, but the input signal Din is different from that in the embodiment. In other words, the display 10 displays pictures on the display section 12 based on the input signal Din including a picture signal for two viewers. In this case, the picture signal for two viewers is a picture signal configured by alternately arranging a picture for one viewer and a picture for the other viewer. The shutter control section 15 of the display 10 generates the shutter control signal CTL based on the synchronization control signal Sync supplied from the signal processing section 20 to supply the shutter control signal CTL to the shutter eyeglass devices 60A and 60B through radio communication using, for example, infrared radiation or electric waves.

The shutter eyeglass devices 60A and 60B allow two viewers (not illustrated) to watch two different pictures displayed on the display 10, respectively. The shutter eyeglass device 60A includes a pair of shutters 6A and the shutter eyeglass device 60B includes a pair of shutters 6B. The opening and closing of the pair of shutters 6A are controlled simultaneously by the shutter control signal CTL, and likewise, opening and closing of the pair of shutters 6B are controlled simultaneously by the shutter control signal CTL.

By the above-described configuration, the open/close operations of the shutters 6A of the shutter eyeglass device 60A and the shutters 6B of the shutter eyeglass device 60B are performed in synchronization with switching of a picture for a viewer 9A and a picture for a viewer 9B which are displayed on the display 10 in a time-divisional manner.

Functions and effects of display system 2

Figure 16A:
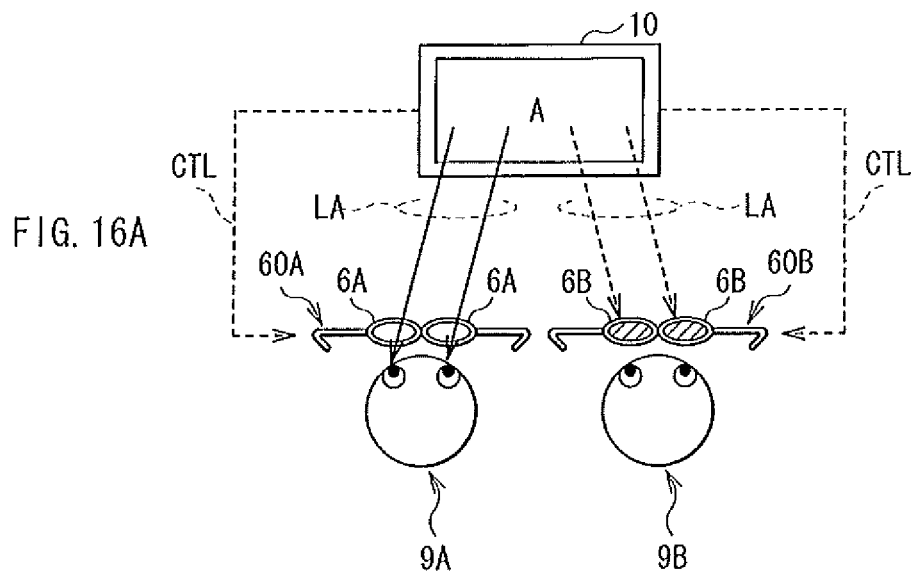
FIGS. 16A and 16B are schematic views illustrating an operation example of the display system illustrated in FIG. 15.
Figure 16B:
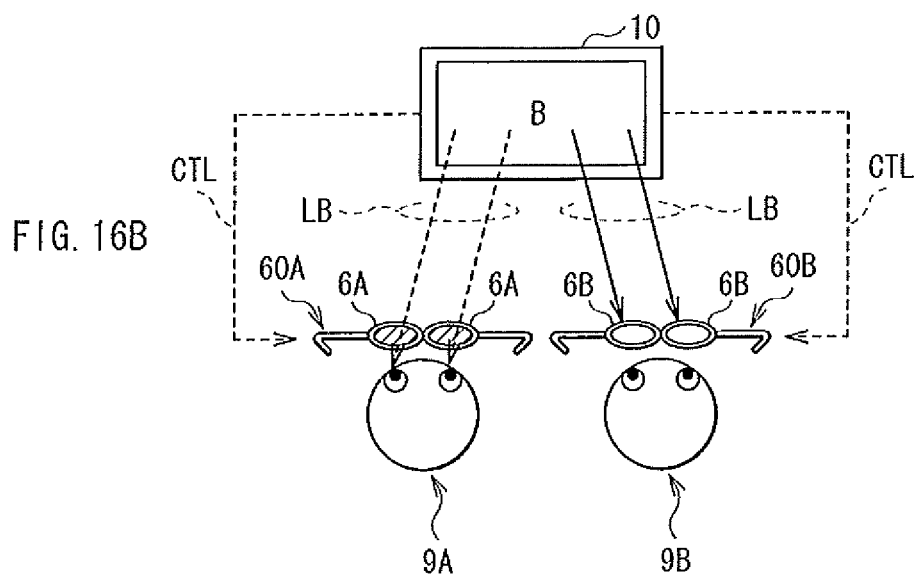

FIG. 16 schematically illustrates a whole operation of the display system 2. FIG. 16A illustrates an operation when the picture A for the viewer 9A is displayed (when display light LA is emitted) and FIG. 16B illustrates an operation when the picture B for the viewer 9B is displayed (when display light LB is emitted).

In the case where the picture A is displayed on the display 10, as illustrated in FIG. 16A, the shutters 6A of the shutter eyeglass device 60A are turned into an open state, and the shutters 6B of the shutter eyeglass device 60B are turned into a close state. At this time, the viewer 9A watches the picture A. On the other hand, when the picture B is displayed on the display 10, as illustrated in FIG. 16B, the shutters 6A of the shutter eyeglass device 60A are turned into a close state, and the shutters 6B of the shutter eyeglass device 60B are turned into an open state. At this time, the viewer 9B watches the picture B. When these operations are alternately performed, the picture A is viewable by the viewer 9A, and the picture B is viewable by the viewer 9B. In other words, a multi-view system in which a plurality of viewers are allowed to watch a plurality of pictures displayed on one display, respectively, is achievable.

Thus, even in the multi-view system as in the case of the display system 2 according to the modification, the same effects as those in the above-described embodiment and Modification 1 are obtainable by the same functions as those in the above-described embodiment and the like.

Other Modifications

Although the present invention is described referring to the embodiment and the modifications, the invention is not limited thereto, and may be variously modified.

For example, the configurations or kinds of the synchronization control signal Sync, the shutter control command CMD, the command set CS and the stop command set SCf and the bit patterns thereof, and the transmission modes are not limited to those described above, and other configurations or the like may be used.

Moreover, in the above-described embodiment and the like, as the display section, the liquid crystal display is used, but the display section is not limited thereto. For example, instead of the liquid crystal display, an EL (Electro-Luminescence) display, a plasma display or a projector by DLP (Digital Light Processing) may be used.

Moreover, for example, the shutter eyeglass device may support both of the stereoscopic display system and the multi-view system by switching modes.

In addition, the processes described in the above-described embodiment and the like may be performed by hardware (a circuit) or software (a program).

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
a command generator to generate shutter control commands to control a shutter glass device for viewing a content displayed on the display apparatus, the shutter glass device including a first shutter and a second shutter,
wherein the shutter control commands include a command to simultaneously perform operations of open the first shutter and close the second shutter,
wherein the display apparatus selectively transmits the command to simultaneously perform operations of open the first shutter and close the second shutter and does not transmit the command to simultaneously perform operations of open the first shutter and close the second shutter based on a duty ratio representing a ratio of respective open periods for the first shutter and second shutter, such that (i) the command to simultaneously perform operations of open the first shutter and close the second shutter is transmitted when the duty ratio is equal to a first value and (ii) the command to simultaneously perform operations of open the first shutter and close the second shutter is not transmitted when the duty ratio is equal to a second value, and wherein the display apparatus transmits the command to simultaneously perform operations of open the first shutter and close the second shutter only when a duty cycle of a synchronization control signal for the content is within a predetermined range having a lower boundary and an upper boundary, wherein the lower boundary and the upper boundary are different from each other, the predetermined range excluding a range between 0% and the lower boundary, and excluding a range between the upper boundary and 100%.

2. The apparatus according to claim 1, wherein the command generator generates the command to simultaneously perform the operations of open the first shutter and close the second shutter when the duty ratio representing a ratio of respective open periods for the first shutter and second shutter is 50%.

3. The apparatus according to claim 2, wherein the command to simultaneously perform the operations of open the first shutter and close the second shutter is defined by four command bits.

4. The apparatus according to claim 1, wherein the command generator is operable to generate one or more command sequences each comprising a plurality of the shutter control commands.

5. The apparatus according to claim 4, wherein each of the plurality of shutter control commands of each of the one or more command sequences is defined by four command bits.

6. The apparatus according to claim 4, wherein one of the command sequences is a stop sequence that is generated to command simultaneous performance of operations of open the first shutter and open the second shutter.

7. A shutter glass device for viewing a content displayed on a display, the device comprising:
a first shutter and a second shutter; and
a determination circuit to interpret received shutter control commands,
wherein the shutter control commands include a command to simultaneously perform operations of open the first shutter and close the second shutter,
wherein the received shutter control commands selectively include the command to simultaneously perform operations of open the first shutter and close the second shutter and do not include the command to simultaneously perform operations of open the first shutter and close the second shutter based on a duty ratio representing a ratio of respective open periods for the first shutter and second shutter, such that (i) the command to simultaneously perform operations of open the first shutter and close the second shutter is included when the duty ratio is equal to a first value and (ii) the command to simultaneously perform operations of open the first shutter and close the second shutter is not included when the duty ratio is equal to a second value, and
wherein the received shutter control commands include the command to simultaneously perform operations of open the first shutter and close the second shutter only when a duty cycle of a synchronization control signal for the content is within a predetermined range having a lower boundary and an upper boundary, wherein the lower boundary and the upper boundary are different from each other, the predetermined range excluding a range between 0% and the lower boundary, and excluding a range between the upper boundary and 100%.

8. The device according to claim 7, wherein the shutter glass device receives the command to simultaneously perform the operations of open the first shutter and close the second shutter when the duty ratio representing a ratio of respective open periods for the first shutter and second shutter is 50%.

9. The device according to claim 8, wherein the command to simultaneously perform the operations of open the first shutter and close the second shutter is defined by four command bits.

10. The device according to claim 7, wherein the determination circuit is operable to interpret one or more command sequences each comprising a plurality of the shutter control commands, and wherein each of the plurality of shutter control commands of each of the one or more command sequences is defined by four command bits.

11. The device according to claim 7, wherein the determination circuit is operable to interpret one or more command sequences each comprising a plurality of the shutter control commands, and wherein the determination circuit is operable to interpret repeated transmission of one of the command sequences as a stop indication.

12. A display system, comprising:
a shutter glass device for viewing a content displayed on a display, the shutter glass device including a first shutter and a second shutter; and
a command generator to generate shutter control commands to control the shutter glass device,
wherein the shutter control commands include a command to simultaneously perform operations of open the first shutter and close the second shutter, wherein the display system selectively transmits the command to simultaneously perform operations of open the first shutter and close the second shutter and does not transmit the command to simultaneously perform operations of open the first shutter and close the second shutter based on a duty ratio representing a ratio of respective open periods for the first shutter and second shutter, such that (i) the command to simultaneously perform operations of open the first shutter and close the second shutter is transmitted when the duty ratio is equal to a first value and (ii) the command to simultaneously perform operations of open the first shutter and close the second shutter is not transmitted when the duty ratio is equal to a second value, and
wherein the display system transmits the command to simultaneously perform operations of open the first shutter and close the second shutter only when a duty cycle of a synchronization control signal for the content is within a predetermined range having a lower boundary and an upper boundary, wherein the lower boundary and the upper boundary are different from each other, the predetermined range excluding a range between 0% and the lower boundary, and excluding a range between the upper boundary and 100%.

13. The system according to claim 12, wherein the command generator generates the command to simultaneously perform the operations of open the first shutter and close the second shutter when the duty ratio representing a ratio of respective open periods for the first shutter and second shutter is 50%.

14. The system according to claim 13, wherein the command to simultaneously perform the operations of open the first shutter and close the second shutter is defined by four command bits.

15. A display method, comprising:

using a processor to generate shutter control commands to control a shutter glass device for viewing a content displayed on a display, the shutter glass device including a first shutter and a second shutter, wherein the shutter control commands include a command to simultaneously perform operations of open the first shutter and close the second shutter, wherein the display selectively transmits the command to simultaneously perform operations of open the first shutter and close the second shutter and does not transmit the command to simultaneously perform operations of open the first shutter and close the second shutter based on a duty ratio representing a ratio of respective open periods for the first shutter and second shutter, such that (i) the command to simultaneously perform operations of open the first shutter and close the second shutter is transmitted when the duty ratio is equal to a first value and (ii) the command to simultaneously perform operations of open the first shutter and close the second shutter is not transmitted when the duty ratio is equal to a second value, and wherein the display transmits the command to simultaneously perform operations of open the first shutter and close the second shutter only when a duty cycle of a synchronization control signal for the content is within a predetermined range having a lower boundary and an upper boundary, wherein the lower boundary and the upper boundary are different from each other, the predetermined range excluding a range between 0% and the lower boundary, and excluding a range between the upper boundary and 100%.

16. The method according to claim 15, wherein the command to simultaneously perform the operations of open the first shutter and close the second shutter is generated when a duty ratio representing the ratio of respective open periods for the first shutter and second shutter is 50%.

17. The method according to claim 16, wherein the command to simultaneously perform the operations of open the first shutter and close the second shutter is defined by four command bits.

* * * * *